United States Patent [19]
Beelman et al.

[11] Patent Number: 5,919,507
[45] Date of Patent: Jul. 6, 1999

[54] PRESERVATION COMPOSITIONS AND METHODS FOR MUSHROOMS

[75] Inventors: Robert B. Beelman; Eric M. Duncan, both of State College, Pa.

[73] Assignee: The Penn State Research Foundation, University Park, Pa.

[21] Appl. No.: 09/120,905

[22] Filed: Jul. 22, 1998

Related U.S. Application Data

[60] Provisional application No. 60/060,670, Oct. 2, 1997.

[51] Int. Cl.⁶ ........................................................ A23L 3/34
[52] U.S. Cl. .......................... 426/268; 426/303; 426/310; 426/335; 426/615
[58] Field of Search .................................... 426/335, 303, 426/310, 615, 268; 252/380

[56] References Cited

U.S. PATENT DOCUMENTS

| | | | |
|---|---|---|---|
| 3,718,482 | 2/1973 | Hinkley | 99/150 |
| 4,066,795 | 1/1978 | Dave | 426/259 |
| 4,814,192 | 3/1989 | Sapers et al. | 426/268 |
| 4,959,483 | 9/1990 | Matsumura et al. | 549/315 |
| 5,055,313 | 10/1991 | Warren | 426/268 |

*Primary Examiner*—Nina Bhat
*Attorney, Agent, or Firm*—Thomas J. Monahan

[57] ABSTRACT

Preservative compositions using toxicologically acceptable ingredients, and employing a pH of 9.0 or above for at least part of the process, for controlling the growth of spoilage bacteria and for preventing unwanted color changes in fresh and processed mushrooms. Aqueous solutions of preservatives are prepared and applied in multiple stages to the mushrooms, by spraying or immersion. More specifically, disclosed is a method for preserving fresh and processed mushrooms, comprising the steps of: contacting the mushrooms with an antimicrobial buffer solution having a pH of from about 9.5 to about 11.0; and rinsing the mushrooms one or more times immediately after the contacting step with pH-neutralizing buffer solutions of erythorbic acid and sodium erythorbate, in ratios of about 1:4, with a sufficient pH to return the mushrooms to the mushroom physiological pH of about 6.5.

8 Claims, 20 Drawing Sheets

PRESERVATION COMPOSITIONS AND METHODS FOR MUSHROOMS

This application claims the benefit of co-pending U.S. Provisional Patent Application Ser. No. 60/060,670 filed Oct. 2, 1997.

FIELD OF THE INVENTION

The present invention relates generally to methods for retarding bacterial spoilage and other unwanted quality changes in fresh and processed mushrooms that are intended for ingestion by humans and lower animals, and more specifically to preservative compositions, especially those employing a pH of 9.0 or above as part of the process, which are especially suitable for practicing said methods.

BACKGROUND OF THE INVENTION

Consumers identify whiteness and cleanliness of fresh white button mushrooms (*Agaricus bisporus*) as the principal factors determining the quality thereof (McConnell, 1991; Beelman, 1987; Schisler, 1983; Barendse, 1984; Wuest, 1981). Consumers prefer to purchase mushrooms which are bright white and free of casing material, compost, or other unwanted particulate contaminants clinging to the surfaces thereof (McConnell, 1991).

Commercial mushroom cultivation practices, typically growing mushrooms in straw-bedded horse manure compost covered with a fine layer of peat or other "casing material," yields mushrooms with unwanted particulate contaminants clinging to the mushroom cap and other surfaces, giving an undesirable appearance (McConnell, 1991). Moreover, mushrooms are typically harvested by hand, introducing a source of contamination with fluorescent pseudomonads and other spoilage organisms, leading to accelerated tissue decay and discoloration (McConnell, 1991).

Mushroom discoloration (browning and purple blotch) occurs when a polyphenol oxidase enzyme (tyrosinase), which naturally occurs at high levels in mushroom cap cuticle (surface) tissue, interacts with phenolic substrates, also naturally occurring in mushroom tissue, to produce the brown pigment melanin. In healthy, intact mushroom tissue, the enzyme and its substrates are located in separate subcellular compartments, and are therefore prevented from reacting to form colored pigments. Unfortunately, mushroom tissue is highly susceptible to damage by bacterial action or by physical handling, and this damage allows the browning enzyme and its substrates to interact, resulting in unwanted color changes in the mushroom tissue.

It would be highly desirable, therefore, to provide a commercial, toxicologically acceptable preservative treatment to prevent bacterial damage to mushroom tissue, indirectly preventing discoloration, and to inhibit directly the polyphenol oxidase-mediated browning reaction. Moreover, it would be especially desirable to introduce these preservatives to mushrooms in the form of a spray or wash which would remove compost, casing material, and other unwanted particulate material cling to mushroom surfaces.

Prior to 1986, aqueous solutions of sulfite, particularly sodium metabisulfite, were used to wash mushrooms for the purpose of removing unwanted particulate matter, and to enhance mushroom whiteness. In 1986, however, the U.S. FDA banned the application of sulfite compounds to fresh mushrooms, due to severe allergic reactions to sulfites among certain asthmatics.

Following the ban on sulfite compounds for processing of fresh mushrooms, there have been several efforts to develop wash solutions for use as a suitable replacement for sulfites. While sulfite treatment yields mushrooms of excellent initial whiteness and overall quality, it does not inhibit the growth of spoilage bacteria. Therefore, the quality improvement brought about by sulfite use is transitory. After 3 days of refrigerated storage, bacterial decay of sulfited mushrooms becomes evident. Traditionally, this was not a concern to mushroom growers, because sulfite washes were inexpensive, effective at removing unwanted particulates, and gave excellent initial quality.

The banning of sulfite washes, however, gave researchers incentive not only to find a suitable sulfite replacement, but also to improve upon sulfite washes by developing a preservative treatment which would extend washed mushroom shelf life beyond that attainable by sulfiting, and which would improve storage quality over that of sulfited mushrooms. McConnell (1991) developed an aqueous preservative wash solution containing 10,000 parts per million (ppm) hydrogen peroxide and 1000 ppm calcium disodium EDTA. The hydrogen peroxide serves as an antimicrobial agent, while EDTA enhances antimicrobial activity and directly interferes with the enzymatic browning reactions. Copper is a functional cofactor of the mushroom browning enzyme, tyrosinase, and tyrosinase activity is dependent upon copper availability. EDTA binds copper more readily than does tyrosinase, thereby sequestering copper and reducing tyrosinase activity and associated discoloration of mushroom tissue.

Hydrogen peroxide acts as a bactericide by causing oxidative damage to DNA and other cellular constituents. Sapers (1994) adapted McConnell's (1991) hydrogen peroxide treatment, incorporating hydrogen peroxide into a two-stage mushroom wash, employing 10,000 ppm hydrogen peroxide in the first stage and 2.25% or 4.5% sodium erythorbate, 0.2% cysteine-HCL, and 500 ppm or 1000 ppm EDTA in aqueous solution in the second stage. Hydrogen peroxide treatments typically yielded mushrooms nearly as white as sulfited mushrooms initially, and whiteness surpassed that of sulfited mushrooms after 1–2 days of storage at 12° C., and shelf life was dramatically improved (McConnell, 1991). Hydrogen peroxide, however, is not currently approved for treatment of fresh produce. More efficacy and safety data are required. Moreover, as the browning reaction itself is oxidative, it would be advantageous to employ a non-oxidative agent, rather than a strong oxidizer such as hydrogen peroxide, for controlling bacterial growth.

SUMMARY OF THE INVENTION

The present invention provides a sulfite alternative employing high pH (preferably 10.5–11.0) to control bacterial growth on mushrooms, and browning inhibitors to minimize enzymatic browning of mushroom tissue.

High pH (9.0 or above) has been shown to be effective for controlling the growth of bacteria in egg washwater (Catalano and Knabel, 1994). The present invention adapts high-pH solutions as an antimicrobial wash treatment for fresh mushrooms, to prevent bacterial decay of mushroom tissue and resultant tissue browning. With their high susceptibility to tissue damage, mushrooms represent a unique application of high-pH preservative treatments. Solution exposure time must be carefully controlled, to optimize bacterial destruction while avoiding counterproductive overexposure of mushrooms to extremes of pH, resulting in chemical damage to tissue. Thus, the present invention comprises a multiple (two- or three-) stage wash procedure, with an initial high-pH antimicrobial step, followed by one or more pH neutralization/browning inhibitor washes, with an erythorbic acid/sodium erythorbate buffer with EDTA added, for example.

The present invention provides a high-pH treatment for the control of bacterial spoilage of mushrooms. A first-stage, high-pH wash destroys bacteria, but might also directly damage mushroom tissue. This is avoided, however, if mushroom exposure time to the high-pH solution is brief and is followed immediately by a second-stage neutralization buffer, consisting primarily of the enzymatic browning inhibitors erythorbic acid and sodium erythorbate.

Solutions of varying concentrations of trisodium phosphate (TSP) or sodium bicarbonate were adjusted to pH 11.0 and reacted with equal volumes of erythorbic acid/sodium erythorbate browning inhibitor solutions, to screen for combinations yielding a final pH in the mushroom physiological range. Solutions with the desired buffering capacities were screened for effectiveness in vivo in mushroom washing trials. Reflectance colorimetry and visual inspection for bacterial blotch and other defects were used to determine mushroom quality. A 0.05M sodium bicarbonate buffer wash at pH 10.5–11.0, followed by a 0.6% erythorbic acid/2.4% sodium erythorbate wash yielded initial quality nearly as high as that obtained by sulfite treatment, and far exceeded the performance of sulfite treatment on days 3, 6, and 9 of storage.

With the pH 11.0/3% erythorbate treatment as a starting point, further experiments were designed to optimize the process, examining the effects of varying mushroom exposure time to wash solutions, varying solution temperatures, and the addition of EDTA and calcium chloride to the second-stage wash solution. Optimum mushroom quality and shelf life were obtained when mushrooms were washed in the high-pH solution for 30s at 25° C., and in the erythorbic acid/sodium erythorbate solution for 60s at 10° C. Addition of 1000 ppm calcium-disodium EDTA and 1000 ppm calcium chloride to the second-stage wash further improved mushroom quality. The high-pH/erythorbate treatment with EDTA and calcium chloride equaled or exceeded the initial quality yielded by sulfite treatment, and far exceeded the performance of sulfite treatment on days 3, 6, and 9 of storage. This optimized high-pH treatment also equaled or exceeded the performance of a hydrogen peroxide/EDTA treatment on each day of evaluation, and was as effective as an antimicrobial.

In addition to improving the quality and shelf life of fresh mushrooms, the high pH/erythorbate wash treatment has applications in canning and in freezing. High-pH treatment prior to canning resulted in better (lighter) color than did sulfite or water washing before canning. Mushrooms treated with high pH prior to freezing were much whiter throughout frozen storage than mushrooms washed in water or a sodium sulfite solution.

A principal objective of the present invention is to provide a practical wash treatment that will yield mushrooms as white as sulfite-treated mushrooms initially, while also suppressing bacterial growth, extending shelf life, and improving storage quality.

It is a principal object of the present invention to apply high pH bactericidal solutions to mushrooms followed by neutralization of mushroom pH and introduction of browning inhibitors, to prevent bacterial decay and mushroom tissue discoloration.

BRIEF DESCRIPTION OF THE DRAWING FIGURES

DETAILED DESCRIPTION OF THE PREFERRED EMBODIMENTS

Harvesting of the Mushrooms

Figure 1:
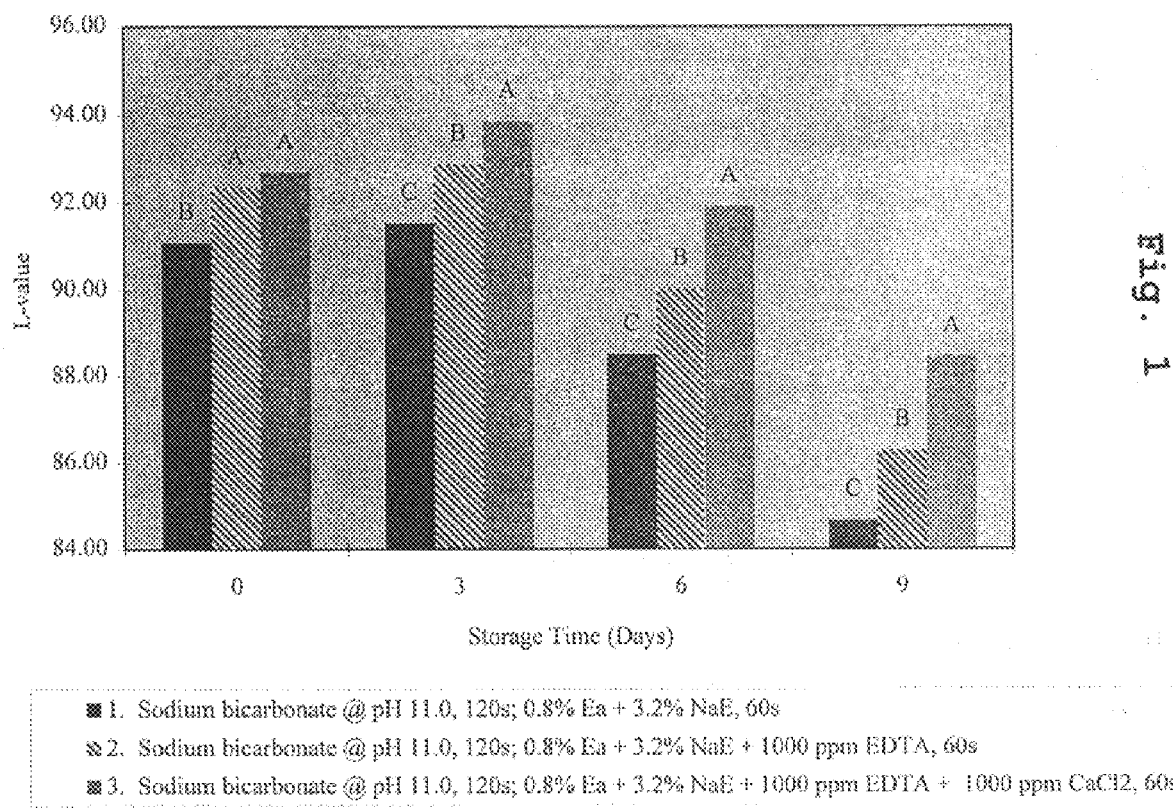
FIG. 1 is a chart illustrating the effect of adding EDTA and calcium chloride to the second-stage wash solution of the high-pH treatment. Within each day, treatments with the same letter are not different at $p<0.05$.

Hybrid off-white (U1) mushrooms were grown at the Mushroom Test Demonstration Facility (MTDF) of the Pennsylvania State University, on traditional horse manure-based compost, using standard MTDF practice. Mushrooms were harvested early in the morning on the day of each experiment. Twice as many mushrooms as were needed for washing were obtained from those picked. Mushrooms were selected for washing based on size, freedom from major blemishes (bruising, gouges), disease (blotch or verticillium), and for maturity (unstretched veils). Only first and second flush mushrooms were used; and, within a given experiment, mushrooms were obtained from a single flush and growing room. Mushrooms were stored at 4° C., randomly assigned to treatment lots, and washed within 8 hours of picking. Almost all of the wash treatments tested consisted of two stages: a first-stage, high-pH antimicrobial wash (typically, a pH 10.0–11.0 sodium bicarbonate buffer), followed by a second-stage neutralization and preservative wash (typically, a mixture of erythorbic acid, sodium erythorbate, calcium chloride, and EDTA). Since high pH was employed as the principal antimicrobial factor, it was necessary to neutralize pH in the second wash stage, to minimize mushroom tissue damage and resultant acceleration of enzymatic browning.

Initially, two solutions were prepared at pH 11.0, the minimum suggested pH for useful antimicrobial action: a 0.05M sodium bicarbonate solution (pH 8.25) adjusted to pH 11.0 with 1.0N sodium hydroxide, and a 1% tribasic sodium phosphate solution (pH 11.74) adjusted to pH 11.0 with 42.5% phosphoric acid.

Second stage, neutralization solutions were prepared from stock solutions of 1%, 2% 3%, and 4%, each, of erythorbic acid and sodium erythorbate. The pH of these stock solutions was measured singly and in varying erythorbic acid-:sodium erythorbate ratios, to give several different formulations at each total solute concentration (1%, 2%, 3%, and 4%).

Neutralization solutions were then combined with equal volumes of pH 11.0 solutions, and the final pH of each mixture was recorded. Results were screened for combinations yielding final pH in the range of 6.50–8.00, i.e., close to mushroom physiological pH, approximately 6.5. Neutralization solutions tested are given in Table 1, with pH measurements alone and in mixture with equal volumes of pH 11.0 solutions. All pH measurements were made using a Beckman Φ 40 pH meter (Beckman Instruments, Inc., Fullerton, Calif.) standardized with Fisher Certified ACS pH 4, 7, and 10 buffers (Fisher Scientific, Inc., Fair Lawn, N.J.). Solutions yielding final pH within the target range were then used in mushroom washing trials, to determine effectiveness at maximizing shelf life and optimizing mushroom color (whiteness).

Washing Procedure

Treatment solutions were prepared with deionized (reverse-osmosis) water and allowed to equilibrate to the desired temperature immediately before washing. Typically, the first, high-pH stage of a two-stage wash treatment was adjusted to 25° C., while the second, neutralization stage was chilled to 10° C. Chemical compounds used in wash solutions are listed in Table 2. Except in experiments where wash duration was an experimental variable, total washing time was 90 seconds: 30 seconds for stage one, and 60 seconds for stage two of two-stage, high-pH treatments, and 90 seconds for single-stage sulfite and deionized (reverse-osmosis) water control lots.

Mushrooms were washed in 3.5-liter polyethylene buckets, at the ratio of 300 g mushrooms per liter of wash solution, agitated gently by hand, using a stainless steel slotted mixing spoon, at the rate of 30 times per minute, and drained in polyethylene colanders. Control mushrooms, treated with a single-stage wash, were transferred to colanders after 30 seconds and immediately re-immersed in the wash solution, to simulate the handling of mushrooms in two-stage treatments.

Washed mushrooms were drained for 5 minutes at room temperature, and colanders were placed in ⅙-size brown paper grocery bags, to prevent excessive moisture loss during overnight holding, making sure that bags did not come into contact with mushrooms. Bags were folded over 10–12 cm from the top, to close, and bagged mushrooms were placed in a 4° C. cooler and held overnight before overwrap packaging and initial color determination.

Packaging

After overnight storage at 4° C., mushrooms were removed from bags, and each treatment lot was randomly divided into four sublots of six caps each, labeled "Day 0," "Day 3,""Day 6," and "Day 9." Mushrooms were then packaged by sublot, caps up, in linear-polystyrene tills. "Day 0" mushrooms were evaluated immediately, and the remaining tills were overwrapped with 60-gauge, PWMF Vitafilm polyvinylchloride film (The Goodyear Tire and Rubber Co., Akron, Ohio), for shelf-life evaluation after 3, 6, and 9 days of storage. A mild heat-sealing treatment was applied to the overwrap. Two 3-mm holes were made through the overwrap, at opposite corners of each package, using self-adhesive labels applied to the overwrap to keep the holes open, to ensure that an aerobic environment was maintained during storage.

Day 3, 6, and 9 sublots were stored in a 12° C. environmental chamber (Lunaire Environmental, Inc., Williamsport, Pa.), with four packages per treatment for sampling on each day of shelf-life evaluation.

Color Measurements

Wash treatment effectiveness at maintaining whiteness and retarding post-harvest browning was determined by measuring mushroom cap color on days 0, 3, 6, and 9 of storage. Color was measured at three locations on the surface of each mushroom cap, using a tristimulus calorimeter (Chromameter Model CR-200, Minolta Corp., Ramsey, N.J.). The Chromameter was calibrated using the standard white calibration plate supplied with the instrument, and L*a*b color coordinates were used for all measurements. A target color of L=97.00, a=−2.00, and b=0.00 was used as a reference standard for internal calculation of overall color deviation (Delta E) from that of the "ideal white mushroom" (Solomon, 1991).

Experiments were structured in a randomized complete block design. Mean whiteness (L-value) and overall color change (Delta E) values were internally calculated for each of the four replicates of each treatment on each day of evaluation, to give a total of four data points per treatment per day. L and Delta E values were analyzed using one-way ANOVA, and means were separated via Fisher's Protected Least-Significant-Difference, with StatView 512+ software (BrainPower, Inc., Calabasas, Calif.).

Bacterial Analysis

Wash treatments yielding the best color (highest L-value, lowest Delta E), initially and over a 9-day shelf life, were screened to determine effectiveness at controlling bacterial growth on the mushroom cap surface. Mushrooms were prepared and washed as in the shelf-life color experiments, and an additional 400 g of mushrooms were randomly sampled from each replicate of each treatment, for each day of analysis (0,3,6,9).

Each 400 g sample was randomly divided into two lots of approximately 200 g, one for total aerobic plate count (APC) on Eugon agar (Difco Laboratories, Detroit, Mich.), and the other for coliform count on violet red bile agar (VRBA) (Difco Laboratories, Detroit, Mich.). Each lot (approximately 200 g) was homogenized with 200 ml of 0.1% peptone in a sterile Waring blender for 1 minute, modifying the procedure of Simons (1994). Mushroom homogenate was serially diluted using 11 ml transfers, followed by 0.1 ml transfers onto duplicate spread plates containing Eugon agar or VRBA. The plates were incubated at 32° C. for 48 hours.

Texture (Firmness) Measurements

Texture was measured the day after washing, using a TA XT2 Texture Analyzer (Stable Micro Systems, Surrey, England) fitted with a conical probe. Penetration depth was set at 0.4 mm. Three readings were taken per mushroom cap, and results were displayed using Stable Micro Systems' XTRA software package.

Canning and Freezing

Washed mushrooms were prepared as canned and frozen products, to evaluate wash treatment effects on canned mushroom color and yield, and on frozen mushroom color. A 60 lb. (27.25 kg) sample of hybrid off-white (U-1) mushrooms was obtained from normal crops grown at the Mushroom Test Demonstration Facility (MTDF), the same morning on the day of washing. Mushrooms were selected from the 27.25 kg sample on the basis of size, maturity (unstretched veils) and freedom from disease, bruising and other major blemishes, and randomly assigned to three treatment lots of 4.5 kg each.

One treatment lot served as a water-washed control, in which mushrooms were washed in 20° C. deionized (reverse-osmosis) water for 90 seconds, at the ratio of 300 g mushrooms per liter of wash solution. Mushrooms were gently agitated by hand, with a stainless steel slotted spoon, 30 times per minute. The second treatment lot was washed in a 20° C. solution of 1000 ppm sodium meta-bisulfite for 90 seconds, at the ratio of 300 g mushrooms per liter of solution, and agitated as in the water control. Water and sulfite control mushrooms were transferred to a polyethylene colander after 30 seconds and then immediately placed back into the wash solution, to simulate the handling of mushrooms in the two-stage wash experimental treatment lots.

Experimental treatment mushrooms were washed for 30 seconds in a 0.05M sodium bicarbonate solution, pre-adjusted to pH 11.0 with 1.0N sodium hydroxide, at 25° C. After 30 seconds, mushrooms were immediately transferred to a 10° C. neutralization wash solution of 6 g/l erythorbic acid, 24 g/l sodium erythorbate, and 1000 ppm calcium-disodium EDTA, at 10° C., and immersed for an additional 60 seconds, for a total wash time of 90 seconds. In both wash stages, mushrooms were washed at the ratio of 300 g per liter of solution, and agitated by hand with a slotted stainless steel spoon, 30 times per minute, as in water and sulfite control treatments.

All mushrooms were drained in polyethylene colanders for 5 minutes at room temperature, with five colanders of 900 g each, on a fresh weight basis, for each of the three treatments. One colander from each treatment was randomly selected for immediate freezing. Mushrooms to be frozen were randomly separated into six lots of 150 g each, sealed in quart-size polyethylene freezer bags, and immediately placed in the walk-in freezer at −18° C. Color readings and bacterial counts were determined at 2, 4, 6, 8, 10, and 12 weeks of frozen storage, using the procedures for fresh mushroom evaluation, except that color readings were collected both while the mushrooms were frozen and after thawing.

The remaining four replicate colanders of 900 g mushrooms from each treatment, were placed in ⅙-size grocery bags, as for fresh mushrooms, and stored for 24 h at 12° C., in preparation for canning, simulating commercial practice. Each mushroom lot was blanched for 5 minutes in boiling water, using steam-jacketed stainless steel kettles, and pre-blanching and post-blanching weights were recorded.

After blanching, the mushrooms were drained for 2 minutes in a stainless steel colander, and drained weights were recorded. For each lot, drained mushrooms were placed into #211×212 cans. A 40-grain sodium chloride tablet was added to each can; cans were filled to the top with boiling tap water, and cans were closed using a Model 424-1ES-00 Closing Machine (American Can Co., Greenwich, Conn.). Canned mushrooms were stored for 7 days at room temperature, cans were opened, and color (L-value and Delta E) and canning yield were determined. Canning yield was calculated by draining each series of six cans for two minutes in a stainless steel colander, recording the final drained weight, and calculating percent yield on a fresh weight basis. A single color reading was taken for each mushroom, for 50 randomly-selected mushrooms per series of six cans. Color (L-value and Delta E) was internally averaged for each series of cans, for a total of four data points and 200 color readings per treatment.

Tribasic Sodium Phosphate Trials

In preliminary experiments, solutions of tribasic sodium phosphate (trisodium phosphate, TSP), were used to generate a washwater pH of 11.0 or higher, as a one-stage wash or in combination with water or the enzymatic browning inhibitors erythorbic acid or sodium erythorbate, in a second-stage wash solution.

Use of 10% TSP by itself, in a wash lasting 120 seconds, was destructive to mushroom pileal tissue, yielding a Day 0 whiteness (L) value of 60.42, vs. 93.36 for a reverse-osmosis water wash and 95.10 for a 1000 ppm sodium metabisulfite wash (Appendix Table 1). TSP-washed mushrooms were dark brown in color and slimy in texture, compared to the bright white, dry, firm sulfite control mushrooms. Reduction of mushroom exposure time to TSP from 120 seconds to 60 seconds, followed by a reverse-osmosis-water wash of 60 seconds dramatically improved color, giving a day-0, L-value of 80.22.

Replacing water with a 2.25% sodium erythorbate solution in the second-stage wash yielded a further improvement in color, to an initial (Day 0) L-value of 89.23. When 2.25% sodium erythorbate was replaced with an equal concentration of erythorbic acid, initial whiteness was higher still, with a day-0, L-value of 90.71. Increasing erythorbic acid concentration from 2.25% to 4.50% gave very little improvement in color through day 3, but on day 6, the increased erythorbic acid treatment was noticeably better, with an L-value of 89.50, versus 84.12 for the 2.25% erythorbic acid treatment. Reduction of TSP concentration from 10% to 5% in the treatments with water as the second-stage wash improved color on days 0, 3, and 6.

None of the experimental treatments matched the whiteness of the sulfite and water controls through Day 3, but the two-stage treatment with 4.50% erythorbic acid as the second-stage wash was significantly better than the water-washed control and not significantly different from the sulfite-washed control on Day 6.

Development of a Two-Stage, High-pH/ Neutralization Wash Treatment

Results of the trisodium phosphate wash trials indicated that the quality of mushrooms washed in basic-pH antibacterial solutions could be improved by subsequent transfer to a neutralization solution of erythorbic acid and sodium erythorbate. Erythorbate solutions acted as both an antioxidant, slowing the enzymatic browning reaction, and an acidulant, returning final mushroom pH to physiological range (approximately 6.5), thus minimizing tissue damage due to exposure to high pH.

Solutions of 1%, 2%, 3%, and 4% total erythorbate were prepared, each at 4:1, 3:1, 1:1, and 1:3 erythorbic acid: sodium erythorbate ratios. Single 1%, 2%, 3%, and 4% erythorbic acid and sodium erythorbate solutions were also prepared, for a total 24 test solutions. Solution pH was measured initially and after mixing with an equal volume of 1% trisodium phosphate at pH 11.0, or with 0.05M sodium bicarbonate at pH 11.0. Results are given in Table 1. The buffering capacity of the TSP solution was greater than that of the sodium bicarbonate solution. Several 2%, 3%, and 4% erythorbic acid/sodium erythorbate combinations effectively acidified the sodium bicarbonate buffer to physiological pH. Only the most acidic (3:1 erythorbic acid: sodium erythorbate) 4% solution, and single 3% and 4% erythorbic acid solutions acidified the TSP solution to near physiological pH.

Wash solution combinations yielding a final pH within or near the mushroom physiological range were screened in wash trials, to determine effectiveness at maintaining whiteness throughout a 9-day shelf life. Wash solutions were maintained at room temperature (20° C.). Mushrooms were immersed in the pH 11.0; buffer for 120s, followed by immersion in the erythorbic acid/sodium erythorbate buffer for 60s. The TSP-washed mushrooms were not as white initially and did not maintain whiteness during storage as well as those washed in sodium bicarbonate (Appendix Table 3).

Mushrooms washed in the pH 11.0, 0.05M sodium bicarbonate buffer, followed by the 0.8% erythorbic acid/3.2% sodium erythorbate buffer, were nearly as white initially (L=90.08) as those washed in the 10,000 ppm hydrogen peroxide/1000 ppm calcium-disodium EDTA treatment developed by McConnell (1991), (L=90.48). They were not as white initially as mushrooms washed in a 1000 ppm sodium metabisulfite solution (L=91.56). On day 3, however, the pH 11.0/erythorbate-washed mushrooms were whiter (L=91.78) than either the sulfite-treated mushrooms (L=91.00) or the peroxide-dipped mushrooms (L=90.89). The pH 11.0/erythorbate mushrooms continued to be the whitest on day 6 and day 9, with the L-value difference between treatments increasing with time. The two-stage, pH 11.0, 0.05M sodium bicarbonate/0.8% erythorbate+3.2% sodium erythorbate treatment was used as the reference standard for formula- and process-optimization experiments, with the goals of enhancing initial whiteness to equal or exceed that obtained by sulfite treatment, improving whiteness throughout shelf life, and minimizing ingredient usage.

Addition of EDTA and $CaCl_2$ to the Second-Stage Wash

McConnell (1991) found that the addition of 1000 ppm calcium-disodium EDTA enhanced the performance of an antimicrobial, 10,000 ppm hydrogen peroxide wash solution, supporting the findings of Eagon (1984) and Shibasaki (1978), that EDTA enhances the effectiveness of antimicrobial agents. In addition, EDTA may inhibit enzymatic browning in mushrooms by sequestering copper, a tyrosinase cofactor (McCord and Kilara, 1983).

The shelf life and quality benefits of adding calcium chloride to mushroom irrigation water have been extensively documented (Kukura, 1997, Miklus and Beelman, 1996, Simons, 1994, Solomon et al., 1991, Barden et al., 1990). Guthrie (1984) found that the addition of calcium chloride (10 mM) to Oxine antibacterial solutions enhanced the antibacterial effect and yielded firmer mushrooms.

When 1000 ppm calcium-disodium EDTA and then 1000 ppm calcium chloride were added to the erythorbic acid/ sodium erythorbate stage of the pH 11.0/erythorbate wash treatment, there were significant improvements in mushroom whiteness, at p<0.05. The improvement in whiteness was also noticeable upon visual inspection. Results are given in FIG. 1 and in Table 3. In the experiment summarized in FIG. 1, mushrooms were held in the pH-11.0 solution for 60 seconds, followed by 120 seconds in a 4% erythorbate solution. Table 3 represents a separate experiment, in which the pH-11.0 wash was 30 seconds, followed by a 60-second wash in a 3% erythorbate solution. The color improvement due to calcium chloride was greater for the longer wash time, 120 seconds (FIG. 1), in the 4% erythorbate solution, vs. 60 seconds (Table 3) in the 3% erythorbate solution. It was subsequently shown, however, that the best overall performance was yielded by the 30-second pH-11.0 wash, followed by the 60-second, 3% erythorbate+1000 ppm EDTA+1000 ppm calcium chloride wash.

Kukura (1997) showed that mushrooms irrigated with tap water plus calcium chloride were more resistant to discoloration in general, and especially discoloration due to bruising, than were mushrooms irrigated with tap water alone. For mushrooms subjected to bruising treatments, calcium-chloride irrigation was shown to strengthen cell and vacuole membranes, preventing the leakage of polyphenoloxidase (PPO) substrates from the vacuole to the cytoplasm and surrounding medium. Containment of PPO substrates in the vacuole prevents them from interacting with the enzyme, thus preventing enzymatic browning. Electron microscopy did not reveal the same structural difference between calcium-added and no-calcium treatments when calcium chloride was incorporated into the wash treatment. Mushrooms in this study, however, were not subjected to bruising, and this may explain why the protective effect of calcium was not evident in the micrographs of washed-mushroom tissue. There was, however, an improvement in mushroom whiteness as a result of the addition of 1000 ppm calcium chloride to the second-stage wash solution (FIG. 1, Table 3).

Calcium chloride addition to the second-stage wash also affected bacterial populations. On day 0, plate counts were higher for calcium-treated mushrooms, vs. high-pH, no-calcium mushrooms, at $p<0.05$ (Table 4). By day 9, however, plate counts for high-pH, no-calcium mushrooms were significantly higher than counts for high-pH-plus-calcium mushrooms. There was no significant difference in plate count between the two high-pH treatments on day 3 and day 6.

Barden et al. (1990) found that bacterial counts were consistently lower for mushrooms with 0.5% calcium chloride added to the irrigation water than for mushrooms with no calcium chloride added to the irrigation water. The day 9 plate count results suggest that a similar relationship between calcium and bacterial growth exists at the end of the shelf life for mushrooms washed in high-pH solutions containing 0.1% calcium chloride.

Solomon (1989) proposed that improvements in mushroom quality due to $CaCl_2$ irrigation treatments were the result of surface accumulation of calcium, which reduced water activity and bacterial growth, and concomitantly increased surface light reflectance. This is supported by the data in Table 3, showing an increase in whiteness between day 0 and day 3, possibly the result of post-washing moisture loss. In the water-washed control mushrooms, the effect is likely negated by the greater increase in bacterial numbers between day 0 and day 3 (Table 4).

The higher day 0 bacterial populations for the calcium chloride high-pH wash, vs. the no-added-calcium high-pH wash suggest that, at least initially, for high-pH-treated mushrooms, there are effects of calcium on bacterial growth unrelated to the reduction in water activity at the cap surface. Mendonca et al., 1994, concluded that the destruction of food-borne pathogens by high pH involves disruption of the cytoplasmic membrane. As Ferguson (1984) and Miklus and Beelman (1996) have suggested that calcium stabilizes biological membranes, it is possible that the 0.1% $CaCl_2$ added to the high-pH wash protected both bacterial cell membranes and mushroom tissue membranes from damage due to high pH. In terms of bacterial survival and growth, however, this appears to be only an initial effect. After day 0, bacterial counts for calcium-washed mushrooms were found to be lower than or not significantly different from counts for mushrooms washed without calcium. It is possible that, later in storage, the effect of calcium in lowering surface water activity predominates.

Time and Temperature Effects

Color

Figure 2:
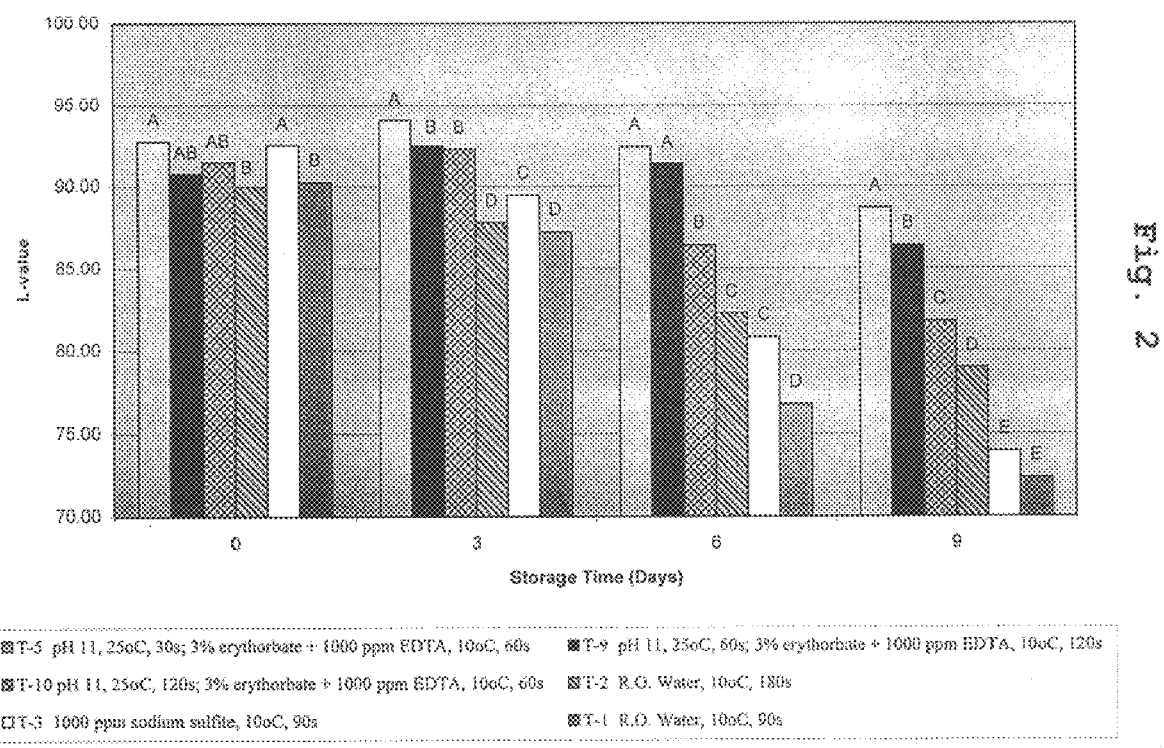
FIG. 2 is a chart illustrating the effect of retention time in wash solution on color of hybrid off-white mushrooms. Within each day, treatments with the same letter are not significantly different at the 5% level.
Figure 3:
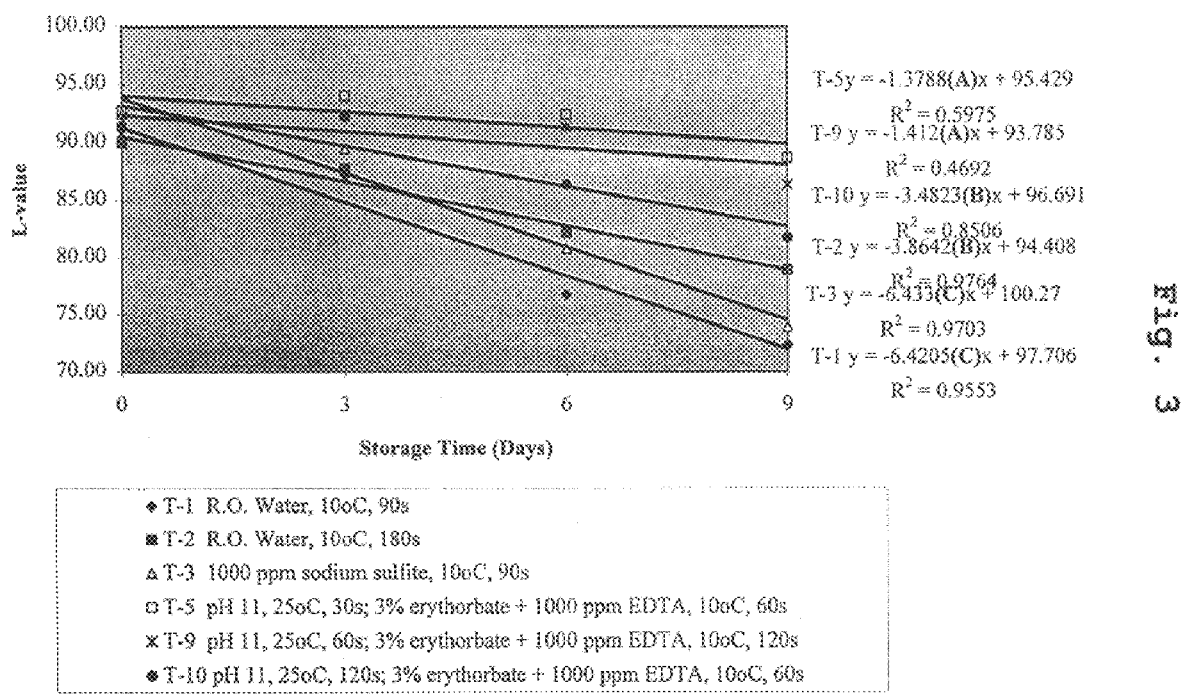
FIG. 3 is a chart illustrating the effect of retention times in wash solutions on the color of hybrid off-white mushrooms. Slopes with the same letter are not significantly different at the 5% level.

Mushroom retention time in the wash solutions and temperatures of the wash solutions were examined, in order to maximize mushroom quality. Changing the holding time in the pH 11.0 buffer from 120s to 60s and in the erythorbate solution from 60s to 120s, reversing the holding times for the two wash solutions, resulted in increased whiteness on days 6 and 9 of shelf life. In addition, the rate of discoloration was decreased for the mushrooms held for the shorter interval in the high-pH buffer and for the longer interval in the erythorbate solution. Halving the retention times to 30s in the high-pH buffer and 60s in the erythorbate buffer resulted in a further increase in whiteness (FIG. 2), but the rate of discoloration over time (slope of the L-value vs. storage time plot) was not changed from that of the 60s/120s treatment (FIG. 3) The rate of discoloration increased, however, when mushrooms were exposed to the high-pH solution for 120 seconds and only immersed in the neutralization wash for 60 seconds (T-10, FIG. 3).

Figure 4:
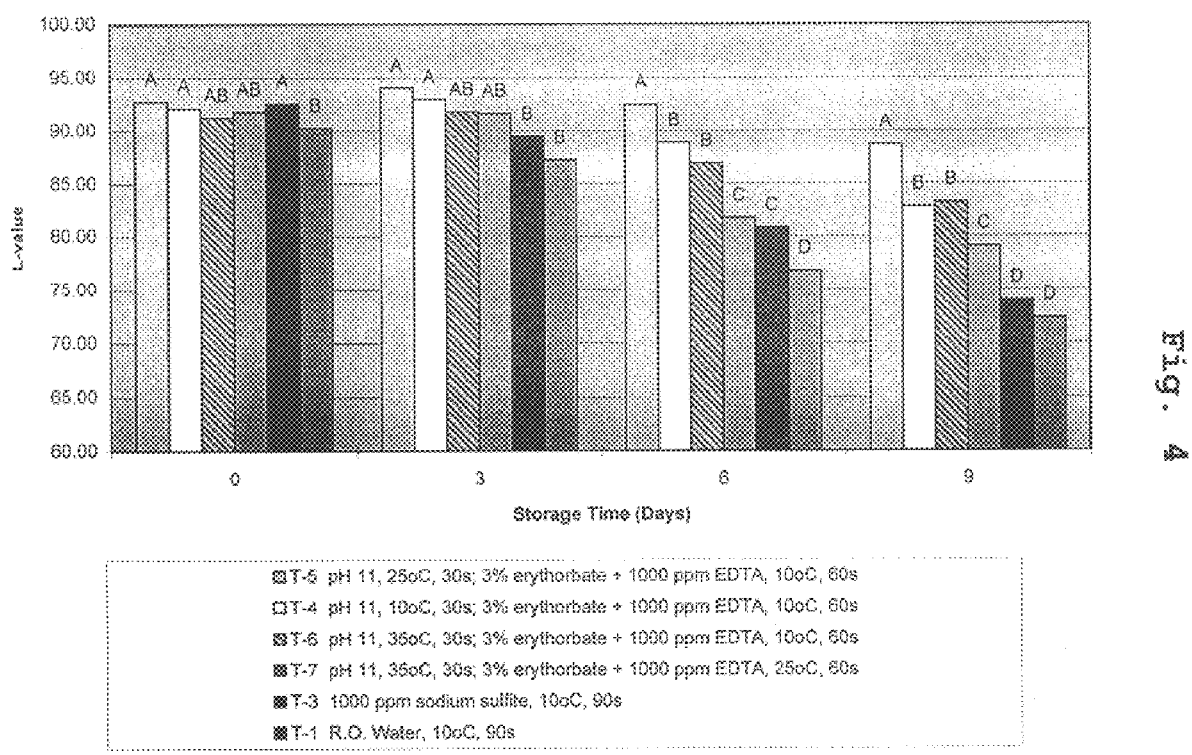
FIG. 4 is a chart illustrating the effect of wash solution temperature on the quality of hybrid off-white mushrooms. Within each day, treatments with the same letter are not significantly different at the 5% level.
Figure 5:
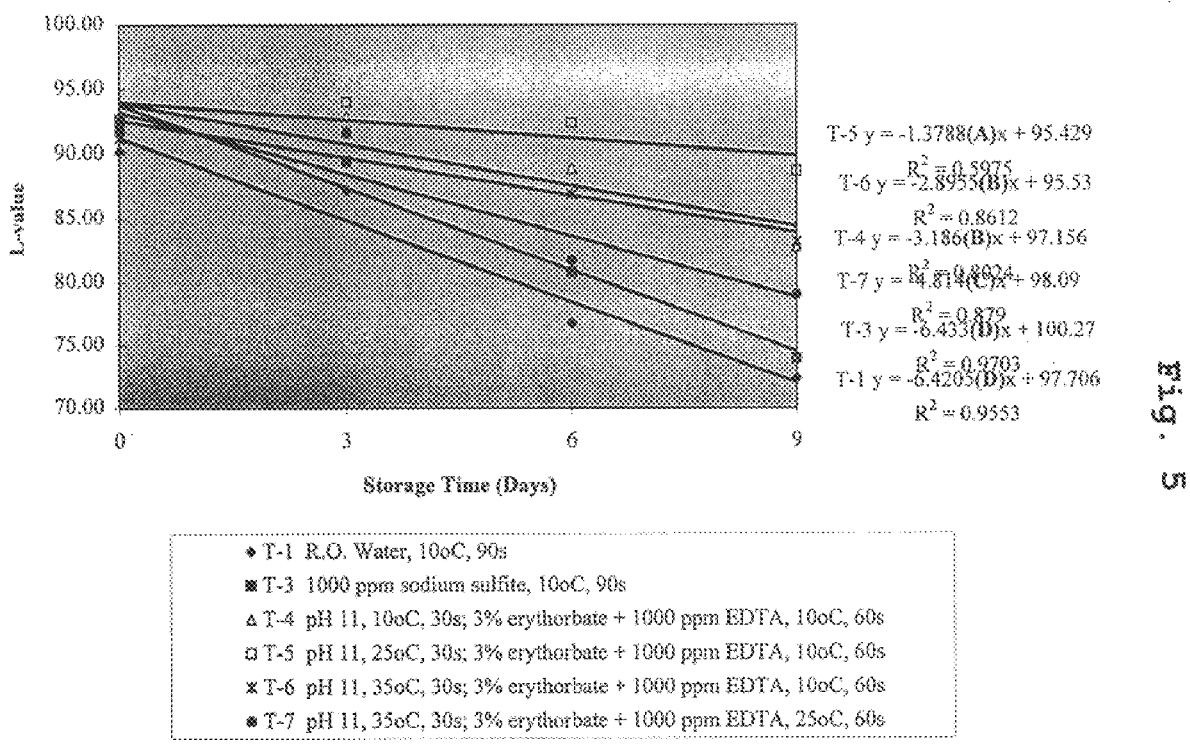
FIG. 5 is a chart illustrating the effect of wash solution temperatures on the quality of hybrid off-white mushrooms. Slopes with the same letter are not significantly different at the 5% level.

Temperature data are given in FIGS. 4 and 5. Optimum wash solution temperatures were 25° C. for the pH 11.0 buffer and 10° C. for the erythorbate buffer. Increasing the temperature of the high-pH buffer to 35° C. decreased whiteness after day 3 of storage, and increased the rate of discoloration. Decreasing the temperature of the high-pH buffer to 10° C. had a similar effect on mushroom color. Increasing the temperature of both solutions, with the high-pH buffer at 35° C. and the erythorbate buffer at 25° C., resulted in a still greater deterioration in color. All high-pH/erythorbate treatments, however, gave better quality than washing in either reverse-osmosis water at 10° C. or 1000 ppm sodium metabisulfite at 10° C. All mushrooms were equilibrated to 4° C. in a walk-in cooler prior to washing.

Water Uptake

Time and temperature parameters affected mushroom water uptake during washing (Table 5). Minimizing water uptake during washing is important to prevent mushrooms from having a waterlogged appearance. As expected, shorter wash times generally resulted in less water uptake, vs. longer wash times at the same solution temperatures. The relationship between temperature of the wash solutions and water uptake was less predictable. Increasing the temperature of the high-pH wash solution from 10° C. to 25° C. decreased water uptake (Table 5, Treatment 3 vs. Treatment 7). Further increasing the temperature to 35° C., however, resulted in an increase, rather than a further decrease, in water uptake (Table 5, Treatment 7 vs. Treatment 5).

Increasing the temperature of the neutralization wash from 10° C. to 25° C. also increased water uptake (Table 5, Treatment 5 vs. Treatment 2). Overall, the time-temperature combination yielding the lowest water uptake was a 25° C., 30 second high-pH wash followed by a 10° C., 60 second neutralization wash.

Texture

Mushroom texture was evaluated, to determine the effects of water uptake and high pH upon the firmness of mushrooms. There was no significant difference in firmness between unwashed mushrooms, mushrooms washed in water or in sodium sulfite, and mushrooms treated with hydrogen peroxide/EDTA or with high-pH/neutralization washes (Table 6 ).

First-Stage Wash Solution pH vs. Mushroom Quality

Figure 6:
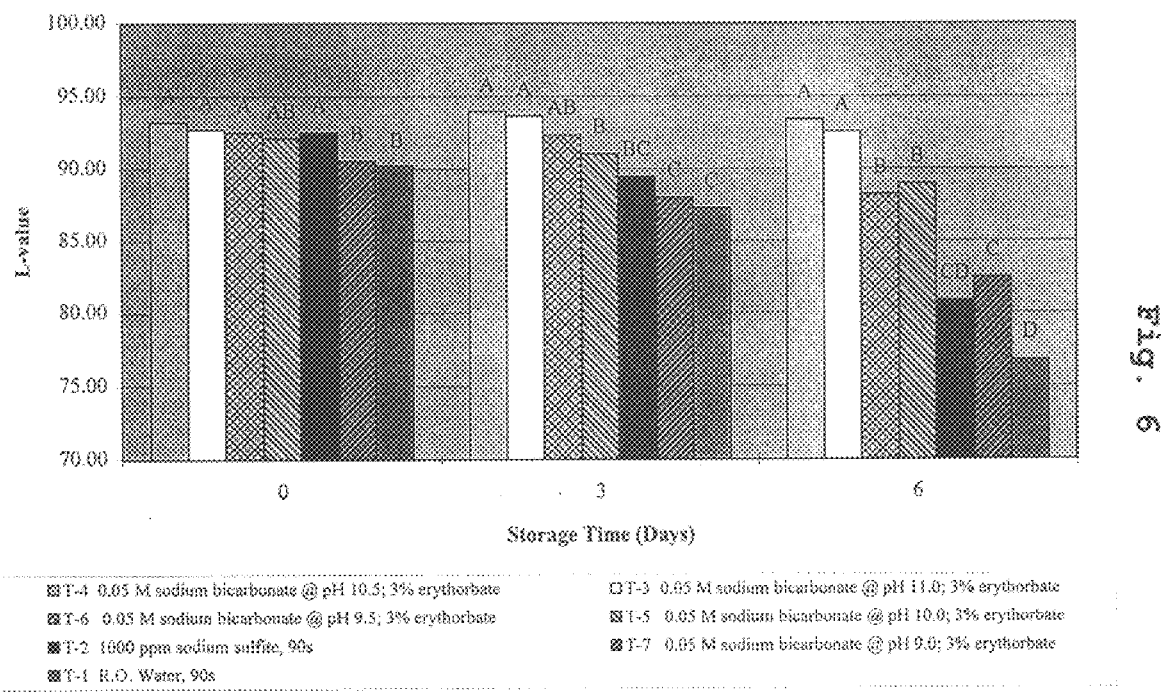
FIG. 6 is a chart illustrating the effect of first-stage wash solution pH on the color of hybrid off-white mushrooms. Within each day, treatments with the same letter are not significantly different at the 5% level.
Figure 7:
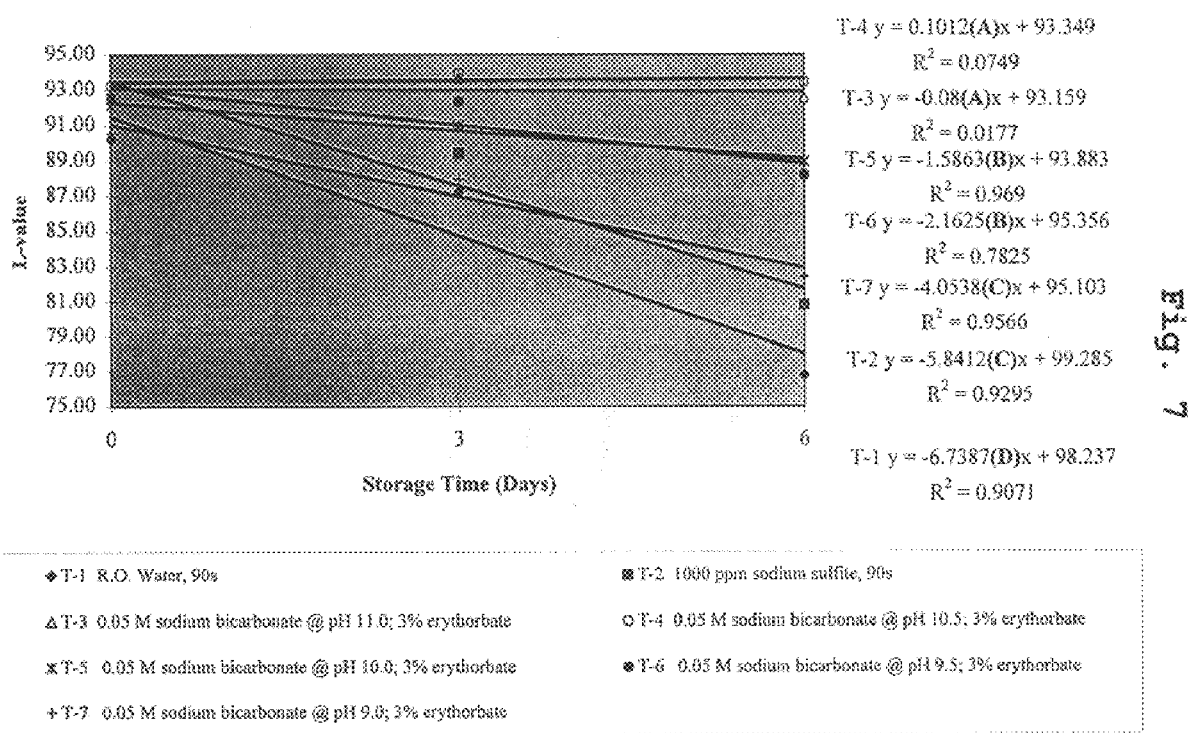
FIG. 7 is a chart illustrating the effect of first-stage wash solution pH on the color of hybrid off-white mushrooms. Slopes with the same letters (within parentheses) are not different at $p<0.05$.

The first-stage wash solution was designed to prevent the growth of bacteria, particularly pseudomonads, on the mushroom cap surface. First-stage wash solution buffers were prepared at pH values of 11.0, 10.5, 10.0, 9.5, and 9.0, to determine the optimum pH, with overall mushroom quality the deciding criterion. All treatments used the 30s retention time in the high-pH buffer at 25° C., and the 60s retention time in the erythorbate buffer at 10° C., shown to yield the highest quality and the least water uptake. A 0.6% erythorbic acid+2.4% sodium erythorbate+1000 ppm EDTA+1000 ppm calcium chloride formula was used for all treatments. Results are given in FIGS. 6 and 7.

Mushroom quality generally decreased with decreasing first-stage solution pH. The pH 10.5 and 11.0 formulations performed best. The pH 10.5 and 11.0 formulations were the best performers overall, yielding mushrooms as white as or whiter than those from other treatments on each day of evaluation, and having a slower rate of discoloration over time.

The pH 9.5 and 10.0 performed as well as the pH 10.5 and 11.0 formulations initially (on day 0). On day 3 and day 6, however, they yielded mushrooms that were less white than those from the higher-pH treatments. The pH 9.0-treated mushrooms were not as white initially as the other high-pH treated mushrooms, and they discolored at a more rapid rate than all but the reverse-osmosis water and sulfite control mushrooms.

Sulfite-treated mushrooms were as white initially as those from the pH 11.0, 10.0, and 9.5 treatments. They discolored at a much higher rate, however, and by day 3, they were not as white as the pH 11.0, 10.0, and 9.5-treated mushrooms. By day 6, the pH 9.0-treated mushrooms were whiter than sulfite-treated mushrooms. Sulfite-treated and water-washed mushrooms discolored at the same rate, but the sulfite-treated mushrooms were whiter initially, and thus on each day of evaluation.

Wash Solution Buffering Capacities vs. Mushroom Quality

The poorer performance of TSP-based treatments, vs. sodium bicarbonate-based treatments, was attributed to insufficient neutralization (reacidification) of the mushrooms by the erythorbate solution, due to the greater buffering capacity of the TSP solutions. Conversely, it was possible that the pH 10.0, 9.5, and 9.0-treated mushrooms were overacidified in the 3.0% erythorbate buffer. To examine the effects of wash solution buffering capacity on mushroom quality, mushrooms were washed in first-stage high-pH buffers of varying sodium bicarbonate concentration, and in second-stage buffers of varying erythorbic acid/ sodium erythorbate concentration.

Sodium Bicarbonate Concentration

Figure 8:
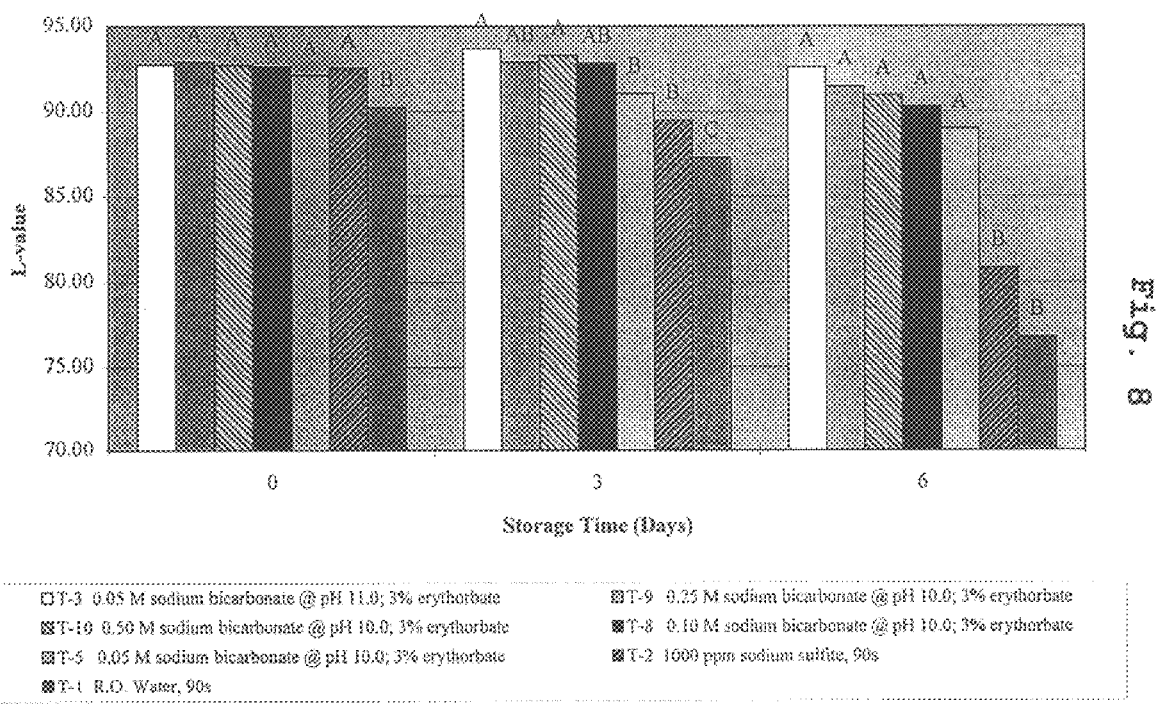
FIG. 8 is a chart illustrating the effect of first-stage wash solution pH on the color of hybrid off-white mushrooms. Within each day, treatments with the same letter are not significantly different at the 5% level.
Figure 9:
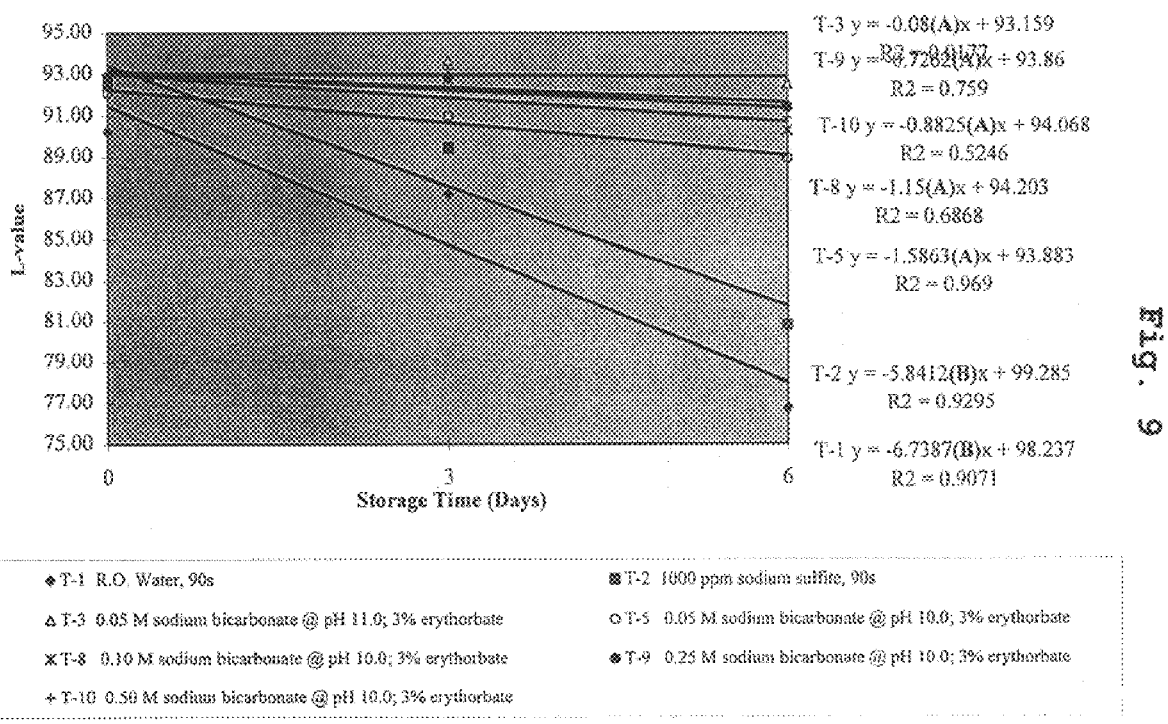
FIG. 9 is a chart illustrating the effect of first-stage wash solution buffering capacity on hybrid off-white mushroom color. Slopes with the same letter are not significantly different at $p<0.05$.

In the first experiment, the second-stage buffer remained constant, 0.6% erythorbic acid+2.4% sodium erythorbate+ 1000 ppm EDTA, while first-stage buffers of varying sodium bicarbonate concentration (0.05, 0.10, 0.25, and 0.50M) were prepared. In all treatments, the first-stage buffer was adjusted to pH 10.0. A pH of 10.0 was chosen, to determine whether a pH 10.0 buffer of increased buffering capacity would maintain whiteness as effectively as a pH 11.0 buffer of lower buffering capacity (included as a reference treatment). Results are given in FIGS. 8 and 9.

Initial whiteness was the same for all treatments except the water control, which was less white than the rest. On day 3, the pH 10.0 treatments with higher sodium bicarbonate concentrations (0.01, 0.25, and 0.50M) were as white as the pH 11.0, 0.05M treatment. The 0.05M, pH 10.0 treatment was not as white as the 0.05M, pH 11.0 treatment. On day 6, there were no differences in whiteness between any of the pH 10.0 treatments and the pH 11.0 treatment. All of the high-pH treatments were whiter than the sulfite and water controls.

Increasing the buffering capacity of a lower-pH, first-stage wash solution was shown to improve mushroom quality, but the effect was only seen in the middle of the storage period. On the first day of storage after washing and six days after washing, there were no differences in whiteness between the pH 11.0 treatment and any of the pH 10.0 treatments of varying sodium bicarbonate concentration.

Erythorbic Acid/Na Erythorbate Concentration

In this experiment, the first-stage buffer, 0.05M sodium bicarbonate at pH 11.0, was tested in combination with three different second-stage buffers:

1. 0.8% erythorbic acid+3.2% sodium erythorbate+1000 ppm EDTA (4% total erythorbate).
2. 0.6% erythorbic acid+2.4% sodium erythorbate+1000 ppm EDTA (3% total erythorbate).
3. 0.4% erythorbic acid+1.6% sodium erythorbate+1000 ppm EDTA (2% total erythorbate).

Figure 10:
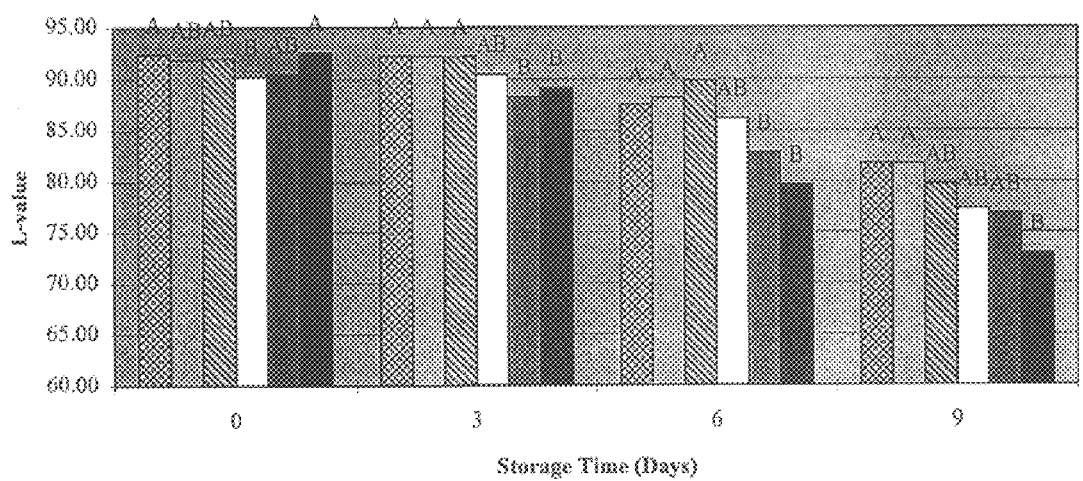
FIG. 10 is a chart illustrating the effect of erythorbic acid/sodium erythorbate concentration on color of hybrid off-white mushrooms. Within each day, treatments with the same letter are not significantly different at the 5% level.
Figure 11:
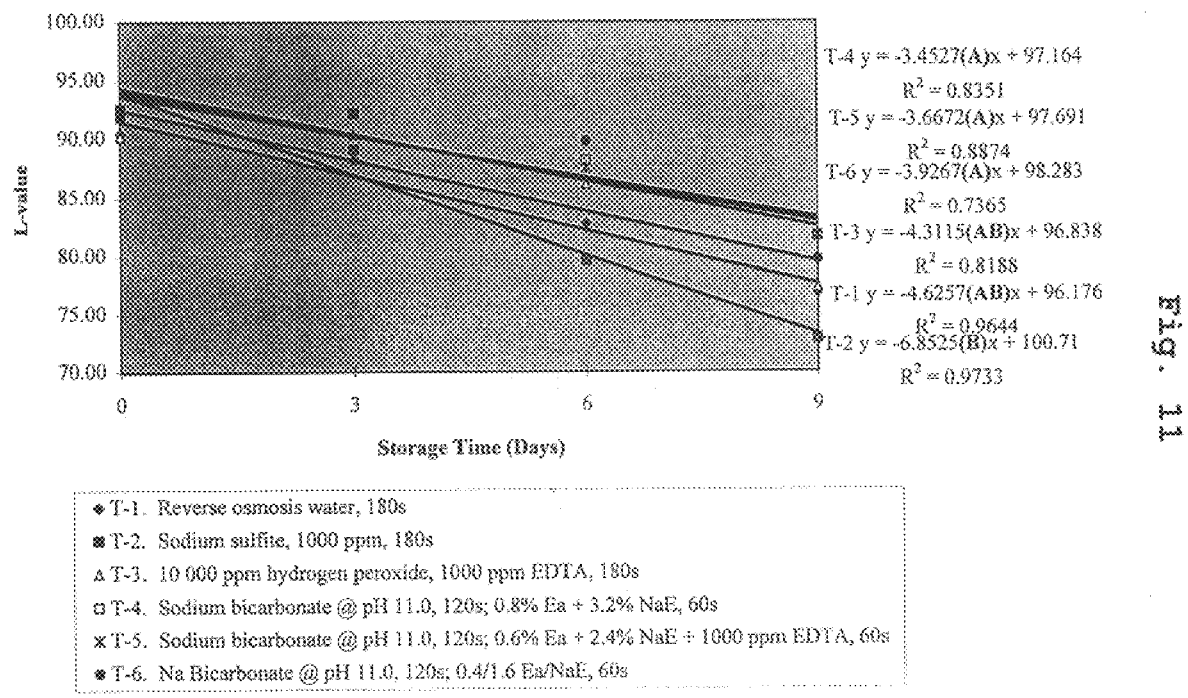
FIG. 11 is a chart illustrating the effect of erythorbic acid/sodium erythorbate concentration of hybrid off-white mushrooms. Slopes with the same letter are not different at the 5% level.

Results are given in FIGS. 10 and 11.

There was no difference in whiteness between mushrooms washed in the three erythorbate solutions, on any of the days (0,3,6,9) of evaluation. Sulfite control mushrooms were as white as the experimentally treated mushrooms initially (day 0), but were less white on days 3 and 6. On day 9, the 3% and 4% erythorbate-treated mushrooms were still whiter than the sulfite-treated mushrooms. Mushrooms treated with 2% erythorbate were not whiter, at $p<0.05$, than sulfite-treated mushrooms, on day 9.

Hydrogen peroxide/EDTA-washed mushrooms not as white initially as mushrooms washed in sulfite or in the pH 11.0/3% erythorbate treatment. They were, however, as white as those washed in water, pH 11.0/2% erythorbate, or pH 11.0/4% erythorbate. On days 3, 6, and 9, the hydrogen peroxide/EDTA treatment performed as well as the 2%, 3%, and 4% erythorbate treatments. The rate of discoloration (slope of the L-value vs. storage-time plot) was not different, at $p<0.05$, from that of the high-pH/erythorbate-treated mushrooms. Sulfite-treated mushrooms discolored at a faster rate than all of the other treatments.

In summary, the high-pH treatment with the 3% erythorbate second-stage wash performed best, yielding mushrooms as white as or whiter than those from all other treatments on all four days of evaluation.

Effect of High-pH Treatment on Bacterial Growth

It has been shown in testing to date that, in general, the performance of a two-stage, high-pH buffer/erythorbate buffer preservative wash treatment increased as the pH of the first-stage buffer increased, as measured by mushroom whiteness. In addition to the inhibition of enzymatic browning by erythorbic acid, sodium erythorbate, and EDTA in the second-stage buffer, there is an improvement in mushroom shelf life and quality as a result of exposure to high pH in the first stage of washing. It was hypothesized that this positive effect of high pH on mushroom quality may be due to destruction of spoilage bacteria on the mushroom cap surface.

Figure 12:
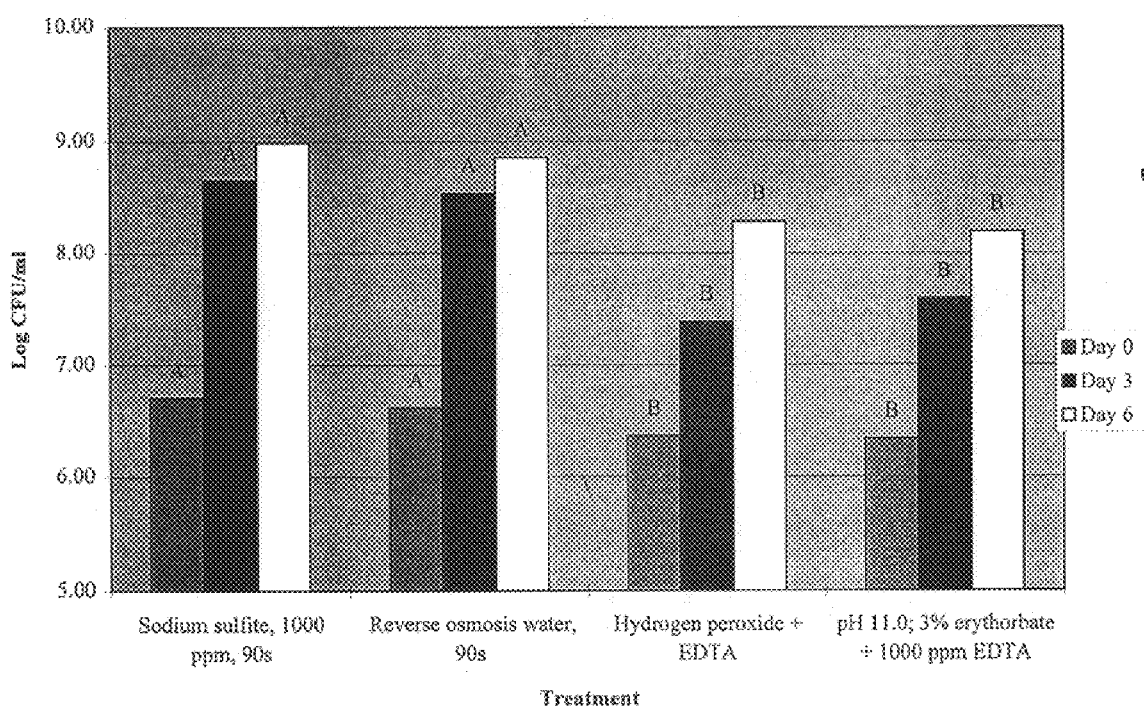
FIG. 12 is a chart illustrating the comparison of aerobic plate count on mushrooms from four different treatments. Within each day of evaluation, treatments with the same letter were not different at the 5% level.

To assess the antimicrobial effect of the high-pH treatment of fresh mushrooms, aerobic plate counts were determined for four treatments:

1. Reverse-osmosis water, 20° C., 90s 2. 1000 ppm sodium metabisulfite, 20° C., 90s 3. 10 000 ppm hydrogen peroxide+1000 ppm EDTA, 20° C., 90s 4. 0.05M sodium bicarbonate at pH 11.0, 25° C., 30s/ 0.6% erythorbic acid +2.4% sodium erythorbate+1000 ppm EDTA, 10° C., 60s. Results are given in FIG. 12. Note that the statistical groupings differentiate between treatments within a single day of evaluation, and do not indicate differences in bacterial populations over time for a single treatment.

Initially and on all three subsequent days of evaluation, the high-pH and the hydrogen peroxide treatments yielded lower bacterial populations than did the sulfite and the water control treatments. For all four treatments, bacterial populations increased steadily over time. On day 0, populations were $2.20 \times 10^6$ CFU/g for the high-pH treatment, $2.34 \times 10^6$ CFU/g for the hydrogen peroxide treatment, $5.00 \times 10^6$ CFU/g for the water control, and $5.33 \times 10^6$ CFU/g for the sulfite treatment. On day 6, bacterial numbers for the water and sulfite controls reached $7.20 \times 10^8$ and $9.78 \times 10^8$ CFU/g, respectively, while the high-pH and hydrogen peroxide treatments had populations of $1.57 \times 10^8$ and $2.34 \times 10^8$ CFU/g.

The high-pH treatment was as effective as hydrogen-peroxide washing at controlling bacterial growth on washed mushrooms. Both yielded lower bacterial populations than did sulfite treatment or water washing.

Time and Temperature Effects

Wash solution temperatures and mushroom retention times in wash solutions were shown to affect mushroom quality throughout shelf life. These parameters were also investigated microbiologically, to determine their effects on mushroom bacterial populations. The same high-pH treatments were evaluated as for the overall quality experiment:

1. Reverse-osmosis water, 20° C., 90s
2. pH 11.0, 25° C., 30s/3% erythorbate, 10° C., 60s
3. pH 11.0, 10° C., 30s/3% erythorbate, 10° C., 60s
4. pH 11.0, 25° C., 60s/3% erythorbate, 10° C., 120s
5. pH 11.0, 10° C., 60s/3% erythorbate, 10° C., 120s.
   Aerobic plate counts were recorded on days 0, 3, and 6. Results are given in FIG. 13.

On all three days, bacterial populations were lower for the high-pH treatments, vs. the water control. On day 0, the 25° C./10° C. treatment with the 90s total retention time yielded lower bacterial populations than did the high-pH treatments with the other time/temperature combinations. This treatment also yielded the best shelf-life quality.

On day 3, the 25° C./10° C. treatments at both retention times yielded lower bacterial populations than did the other treatments. On Day 6, the 25° C./10° C., 90s treatment still resulted in lower bacterial populations than did all of the other treatments. The longer-retention time treatments, at both temperature combinations, yielded the next-lowest bacterial populations, while the 10° C./10° C., 90s treatment gave the highest bacterial population of he high-pH treatments.

Figure 13:
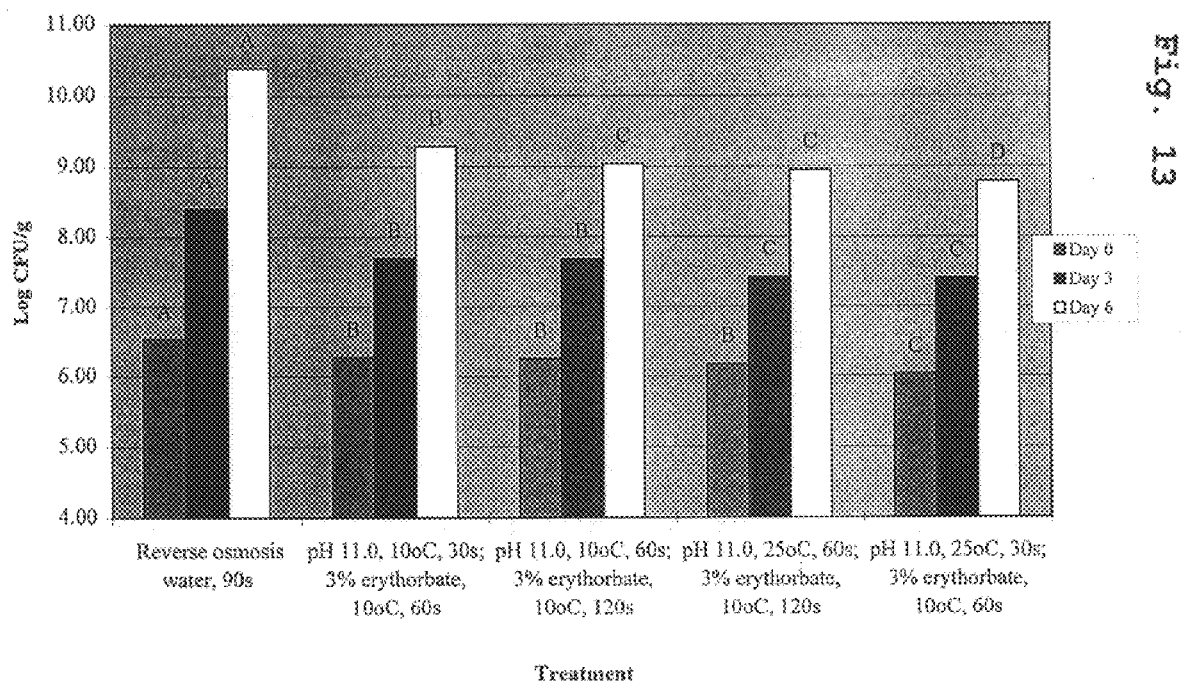
FIG. 13 is a chart illustrating the effect of mushroom holding times in wash solutions and solution temperatures on aerobic plate counts. Within each day, treatments with the same letter were not different at the 5% level.

These results, with a greater bacteria kill occurring at 25° C. than at 10° C., confirm the findings of Raynor (1997), Teo et al. (1995), and Catalano and Knabel (1994), that the antibacterial effectiveness of a high-pH solution is temperature-dependent. Exposure time was also an influencing factor, and there was a time-temperature interaction. On day 0 and day 6, the 25° C. treatment at 90s total wash time yielded lower bacterial numbers than did the same treatment at 180s total wash time. This may have been due to a decrease in water uptake and a resultant increased rate of drying, leaving less surface water available to support bacterial growth. At the lower temperature, where bacterial destruction occurred more slowly, the longer wash time (60s in the pH 11.0 wash) resulted in lower bacterial numbers, on day 6, than did the shorter wash time (30s in the pH 11.0 wash), (FIG. 13).

Performance of Optimal High-pH Treatment vs. Sulfite and Hydrogen Peroxide Treatments Sulfite treatment, though banned commercially from use on fresh mushrooms, was still the benchmark, in testing to date, for initial mushroom whiteness. Sulfite treatment produced bright, extremely white mushrooms initially. As sulfite treatment does not prevent bacterial growth (McConnell, 1991), the whiteness yielded by sulfite treatment is short-lived. Sulfite-treated mushroom quality deteriorated markedly by day 3 (FIG. 14), and dark, sunken lesions appeared by day 6.

The hydrogen peroxide/EDTA treatment developed by McConnell (1991), improved shelf-life quality of fresh mushrooms drastically, compared to sulfite treatment. On days 3, 6, and 9, the peroxide-treated mushrooms were whiter than sulfite-treated mushrooms, and, until day 9, were free of sunken bacterial lesions. On day 9, the lesions were smaller and, by visual inspection, covered less of the mushroom cap surface than those on the sulfite-treated mushrooms. In addition, peroxide-treated mushrooms had a dryer cap surface, vs. sulfite-treated mushrooms, in the later stages (after day 3) of shelf life. Initially, however, sulfite-treated mushrooms are still noticeably whiter than those treated with hydrogen peroxide and EDTA, both by visual inspection and by reflectance colorimetry.

Figure 14:
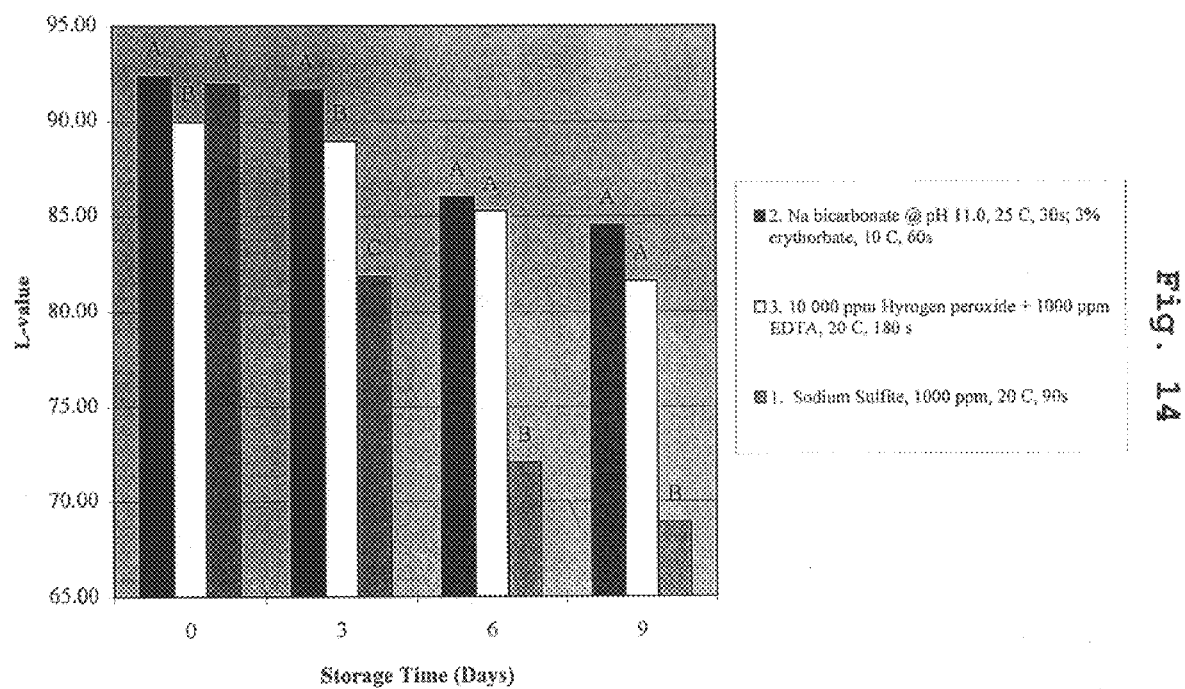
FIG. 14 is a chart illustrating the effectiveness of high-pH, sulfite, and water wash treatments at maintaining whiteness. Within each day, treatments with the same letter were not different at the 5% level.
Figure 15:
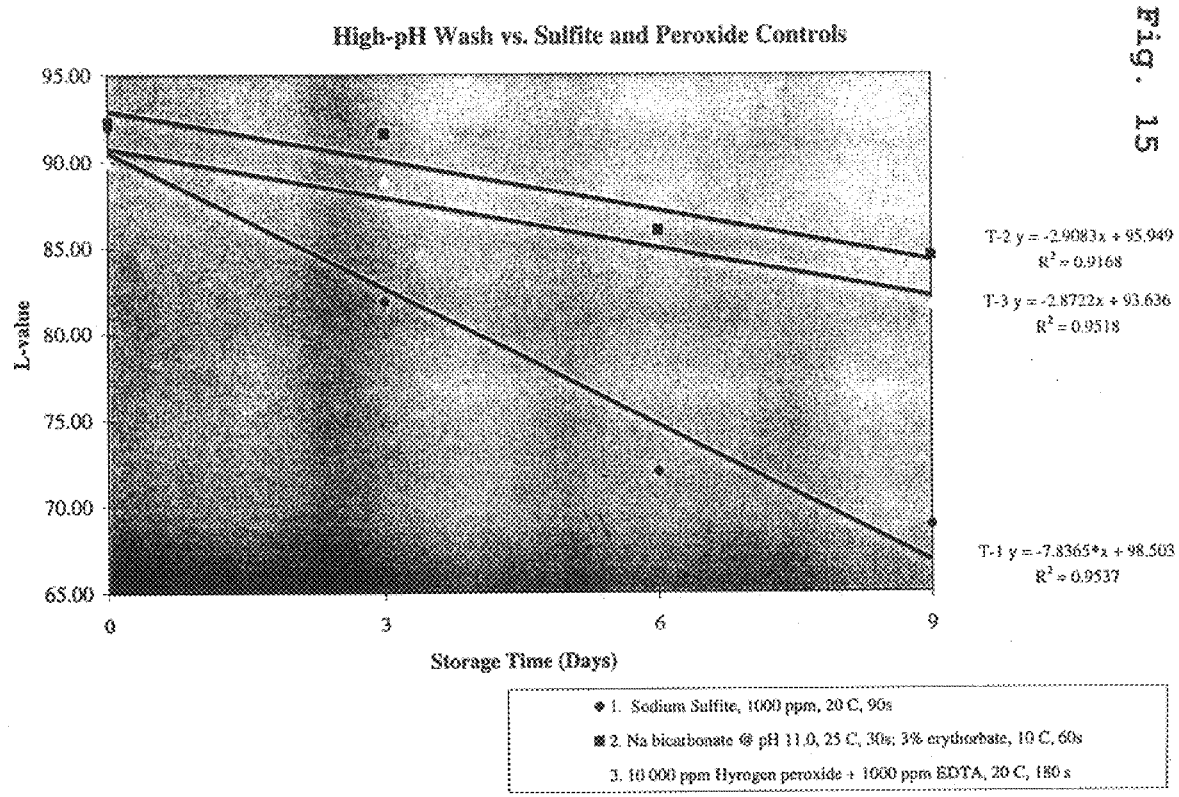
FIG. 15 is a chart illustrating the effectiveness of high-pH, sulfite, and water wash treatments at maintaining whiteness over time. The slope with the asterisk is different from the others at the 5% level.

In terms of performance, the ideal mushroom preservative treatment (barring a theoretical one of infinite whiteness and shelf life) would yield an initial whiteness equal to or greater than that achieved by sulfite treatment, and would maintain whiteness throughout shelf life at least as effectively as treatment with hydrogen peroxide and EDTA. The optimal high-pH treatment (0.05M sodium bicarbonate at pH 11.0, 25° C., 30s/0.6% erythorbic acid+2.4% sodium erythorbate+ 1000 ppm EDTA+1000 ppm calcium chloride, 10° C., 60s) was evaluated for overall performance vs. sulfite treatment and hydrogen peroxide/EDTA treatment. L-value (whiteness) measurements and visual observations were recorded on days 0, 3, 6, and 9, and results are shown in FIGS. 14 and 15.

On day 0, the high-pH treatment yielded the highest numerical whiteness value, with a 6-replicate average of L=92.32, though this was not different (p<0.05) from the sulfite treatment mean of L=91.96. The peroxide-treated mushrooms were less white, at L=89.97. On day 3, the high-ph-treated mushrooms were whiter than the peroxide-treated mushrooms, which were whiter than the sulfite-treated mushrooms. On days 6 and 9 the high-pH and peroxide treatments were equally effective, and both outperformed sulfite treatment by more than 10L-value units. The sulfite-treated mushrooms were visibly slimy and had sunken lesions by day 6. By day 9, the lesions were dark brown to black and covered most or all of the mushroom cap surfaces. The peroxide- and high-pH-treated mushrooms were free of blotch discoloration and sunken lesions through day 6, and showed only mild purple to light tan blotches over part of the cap surface on day 9. On day 6, there was some browning visible on the underside of the cap and on the cut end of the stripe, becoming slightly darker by day 9. The rate of discoloration was not different, at p<0.05, for the high-pH and hydrogen peroxide treatments, whereas sulfite-treated mushrooms discolored much more rapidly over the 9-day shelf life.

In summary, the high-pH treatment yielded mushrooms of equal or higher quality, vs. the sulfite and hydrogen peroxide treatments, on each day of evaluation. Initial performance matched that of sulfites, and performance at the end of shelf life, on days 6 and 9, matched that of the hydrogen peroxide/ EDTA wash. Between day 0 and day 6, when fresh mushrooms are typically displayed for retail sale, the high-pH treated mushrooms were of higher quality than both sulfite-treated and peroxide-washed mushrooms, based on day-3 data.

Applications in Canning and Freezing

Though consumption of canned mushrooms is declining, canning remains economically important to the mushroom industry. With the beneficial effect of high-pH treatment on the quality and shelf life of fresh mushrooms, it was investigated whether there was a similar benefit to high-pH treatment of mushrooms prior to canning or freezing.

Canning

Mushrooms are commonly washed and stored for 1–2 days before canning, to improve yield (Beelman, 1997). The longer mushrooms are stored, the greater the yield improvement (Beelman, 1997); however, color declines. Therefore, canners sometimes wash mushrooms in sulfites to prevent browning. Thus, it was determined whether washing mushrooms in the high pH/neutralization wash would yield color as good as or better than that of a sulfite treatment, while still providing the yield benefit of washing and holding.

Canned mushrooms were washed in reverse-osmosis water, a sulfite solution, or the high-pH/erythorbate solutions prior to blanching, canning, and thermal processing. Mushrooms were stored at room temperature and cans were opened after 7 days, to evaluate color and yield. Color results are given in Table 7. High-pH mushrooms were significantly whiter than sulfite-treated mushrooms (by a difference of approximately 3 L-value points), which were significantly whiter than the water-washed mushrooms.

Yield was calculated as a percentage of fresh weight. Results are given in Table 8. Sulfite treatment and high-pH treatment resulted in similar yields (65.70% and 65.53%, respectively), while water washing resulted in a slightly, but significantly, lower yield of 64.85%.

Since the high-pH wash protected the mushrooms from browning during storage better than sulfites, these mushrooms could perhaps have been stored longer prior to canning to result in even greater canned product yield without sacrificing color.

Freezing

Figure 16:
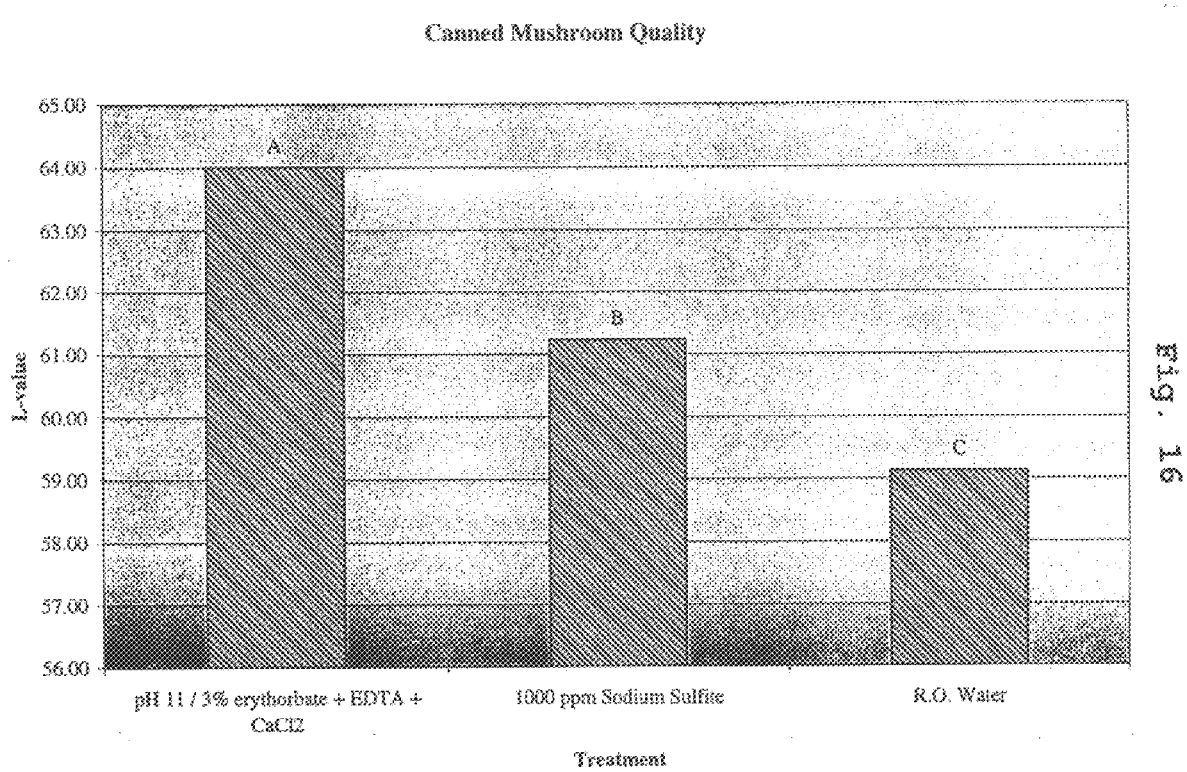
FIG. 16 is a chart illustrating the effectiveness of three treatments at maximizing whiteness of canned mushrooms, after one week of storage. Treatments with the same letter are not different at the 5% level.

Frozen mushroom color was evaluated at 2, 4, 6, and 8 weeks after freezing, and coliform and total aerobic plate counts were determined. Frozen mushrooms pre-treated with the high-pH/erythorbate wash were much whiter than mushrooms pre-washed in water or in 1000 ppm sodium metabisulfite, 2, 4, 6, and 8 weeks after washing and freezing. Frozen mushroom color results are given in FIG. 16.

Figure 17:
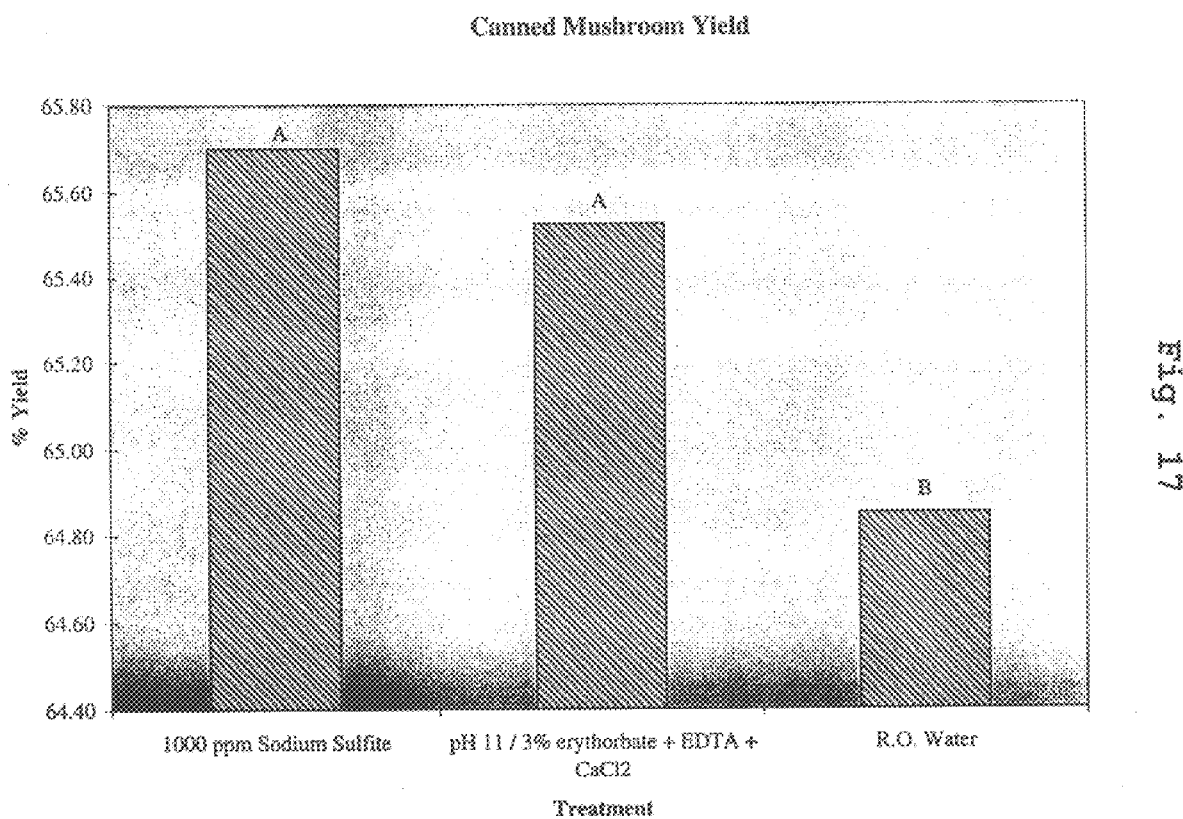
FIG. 17 is a chart illustrating the canning yield of three treatments, expressed on a fresh weight basis. Treatments with the same letter are not different at the 5% level.
Figure 18:
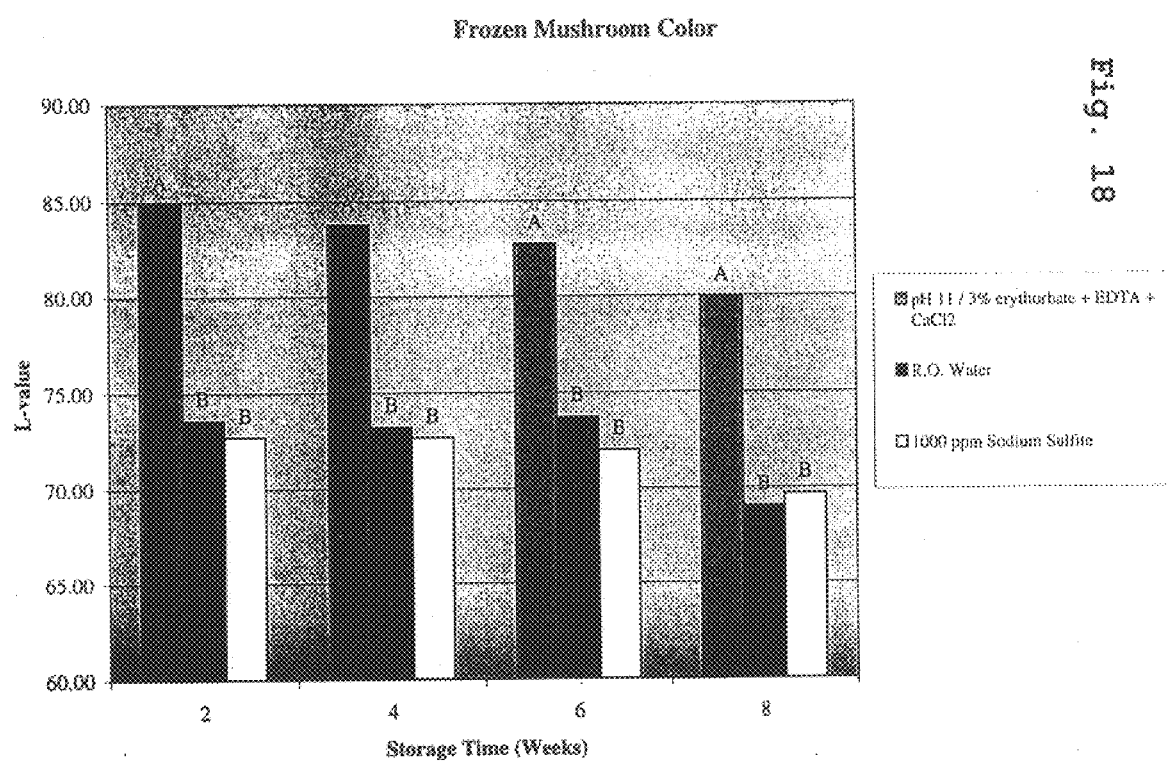
FIG. 18 is a chart illustrating the effectiveness of three wash treatments at maintaining whiteness of mushrooms stored at −10 C. Within each week, treatments with the same letter were not different at the 5% level.
Figure 19:
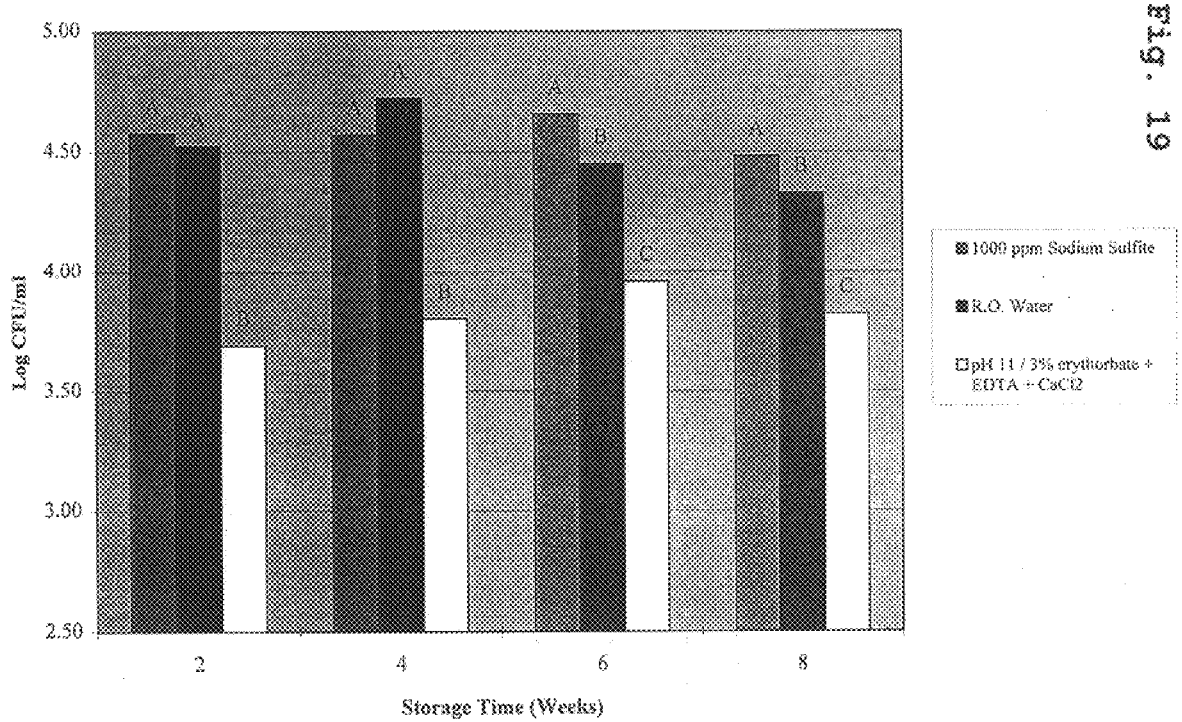
FIG. 19 is a chart illustrating the effectiveness of three wash treatments at maintaining whiteness of mushrooms stored at −10 C. Within each week, treatments with the same letter were not different at the 5% level.
Figure 20:
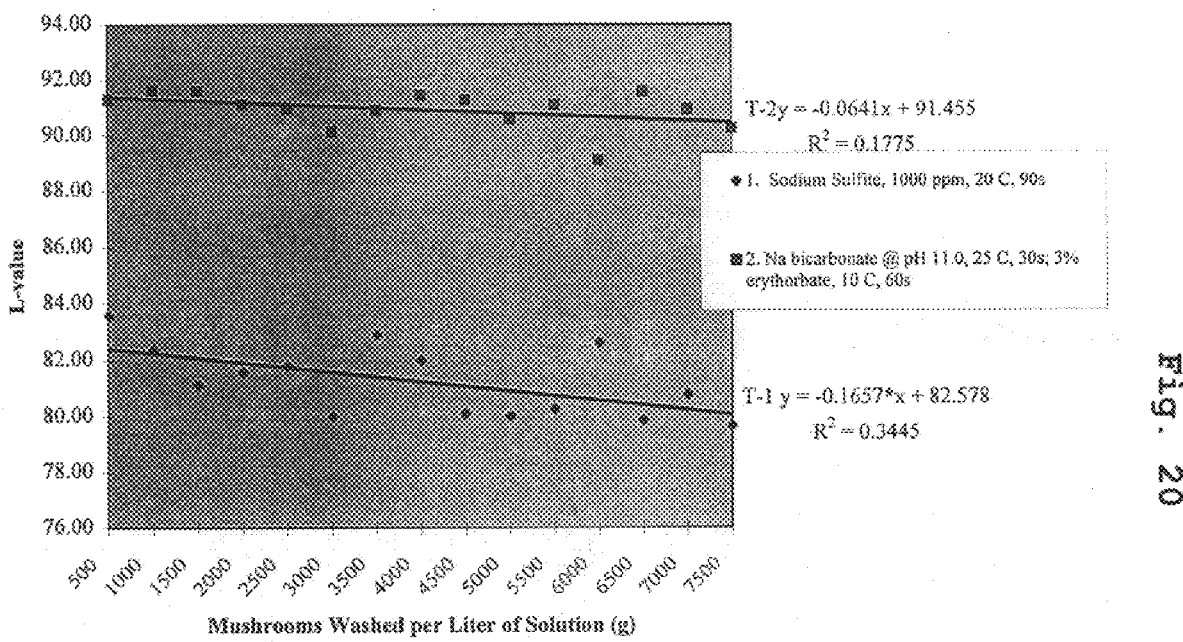
FIG. 20 is a chart illustrating the change in mushroom color with re-use of wash solutions. The sulfite treatment showed a decline in color, while the high-pH treatment did not, at the 5% level.

Bacterial growth on frozen mushrooms was reduced by high-pH pre-treatment (FIG. 17). After six weeks of frozen storage, aerobic plate counts on sulfite-washed mushrooms were higher than those on water-washed mushrooms, but on all four weeks of evaluation, plate counts were lowest for the high pH-washed mushrooms. Coliform counts were<10 CFU/g through 8 weeks of frozen storage for the high-pH treatment. They were similar for water-washed mushrooms, but were as high as 375 CFU/g for sulfite-washed mushrooms (Table 9).

CONCLUSIONS

A two-stage wash treatment consisting of a 0.05M sodium bicarbonate buffer at pH 10.5–11.0 in the first stage, followed by a neutralization solution containing 0.6% erythorbic acid, 2.4% sodium erythorbate, 1000 ppm EDTA, and 1000 ppm calcium chloride in the second stage is very effective at improving shelf life and quality of fresh and processed white mushrooms (*Agaricus bisporus*). This treatment equals the initial whiteness achieved by sulfite treatment, while controlling bacterial growth, preventing blotch and lesion formation, and improving shelf life and storage quality as effectively as or better than wash treatments incorporating hydrogen peroxide and EDTA.

Wash solution temperatures and mushroom holding times in wash solutions affect the performance of the high-pH/ erythorbate treatment. A retention time of 30 seconds in a pH 10.5–11.0 first-stage buffer at 25° C., followed by 60 seconds in a 3% erythorbate solution at 10° C. were determined to be optimal processing conditions. The treatment was found to be robust, however, and was effective over a range of temperatures, holding times, and even wash solution ingredient concentrations. The pH of the first-stage wash solution could be reduced to 9.5–10.0 without serious detriment to performance, particularly if the buffering capacity (sodium bicarbonate concentration) is increased. Similarly, the erythorbic acid concentration could be reduced to as low as 0.4% and sodium erythorbate concentration as low as 1.6% (retaining the 1:4 erythorbic acid: sodium erythorbate ratio) in the second-stage wash.

The addition of 1000 ppm EDTA and 1000 ppm calcium chloride to the second-stage wash solution enhanced the performance of the treatment, with each ingredient resulting in an improvement in mushroom color. EDTA functions to chelate copper, a cofactor of polyphenol oxidase, the browning enzyme in mushrooms. It has also been shown to enhance the performance of antimicrobials. Calcium chloride may function by increasing solute concentration at the mushroom cap surface, making less water available to bacteria and increasing surface light reflectance (whiteness). In addition, it may improve vacuolar membrane integrity, making the mushroom tissue more resistant to bruising and senescence.

The high pH of the first-stage wash is designed to destroy bacteria on the mushroom cap surface, particularly the phytopathogenic fluorescent pseudomonads, which cause blotches and lesions. Erythorbic acid and sodium erythorbate, in addition to returning mushroom pH to physiological range, act as antioxidants, inhibiting enzymatic browning.

In addition to effectively improving the quality and shelf life of fresh mushrooms, high-pH/erythorbate treatment is useful as a pretreatment to improve the color of canned and frozen mushrooms.

TABLE 1

Neutralization Solution Formulations and pH Readings.

| Solution | % Total Solute | Initial pH | pH with Equal Vol. NaHCO$_3$ @ pH 11.0 | pH with Equal Vol. pH TSP @ pH 11.0 |
|---|---|---|---|---|
| 1% Sodium Erythorbate | 1 | 8.35 | 10.75 | 11.13 |
| 2% Sodium Erythorbate | 2 | 8.31 | 10.56 | 11.06 |
| 3% Sodium Erythorbate | 3 | 8.31 | 10.52 | 10.99 |
| 4% Sodium Erythorbate | 4 | 8.29 | 10.45 | 10.96 |
| 1:4 E.A.:Na Erythorbate | 1 | 5.18 | 10.42 | 11.09 |
| 1:3 E.A.:Na Erythorbate | 1 | 5.01 | 10.13 | 10.85 |
| 1:1 E.A.:Na Erythorbate | 1 | 3.87 | 9.60 | 10.70 |
| 3:1 E.A.:Na Erythorbate | 1 | 3.39 | 8.82 | 10.58 |
| 1:4 E.A.:Na Erythorbate | 2 | 5.02 | 10.34 | 11.02 |
| 1:3 E.A.:Na Erythorbate | 2 | 4.85 | 10.06 | 10.88 |
| 1:1 E.A.:Na Erythorbate | 2 | 4.17 | 7.02 | 10.68 |
| 3:1 E.A.:Na Erythorbate | 2 | 3.43 | 5.72 | 9.69 |
| 1:4 E.A.:Na Erythorbate | 3 | 4.53 | 6.91 | 10.71 |
| 1:3 E.A.:Na Erythorbate | 3 | 4.46 | 6.83 | 10.49 |
| 1:1 E.A.:Na Erythorbate | 3 | 4.20 | 5.99 | 9.85 |
| 3:1 E.A.:Na Erythorbate | 3 | 3.98 | 5.00 | 8.30 |
| 1:4 E.A.:Na Erythorbate | 4 | 4.98 | 7.28 | 10.66 |
| 1:3 E.A.:Na Erythorbate | 4 | 4.82 | 6.98 | 10.53 |
| 1:1 E.A.:Na Erythorbate | 4 | 4.29 | 5.25 | 8.30 |
| 3:1 E.A.:Na Erythorbate | 4 | 3.69 | 4.60 | 7.60 |
| 1% Erythorbic Acid | 1 | 2.72 | 6.73 | 10.49 |
| 2% Erythorbic Acid | 2 | 2.64 | 5.59 | 9.34 |
| 3% Erythorbic Acid | 3 | 2.55 | 3.82 | 7.48 |
| 4% Erythorbic Acid | 4 | 2.53 | 3.68 | 7.12 |

E.A. = Erythorbic acid. Na Erythorbate = Sodium Erythorbate. TSP = Tribasic Sodium Phosphate.

TABLE 2

Chemicals Used in the Mushroom Wash Treatments and Their Sources.

| | |
|---|---|
| Calcium-disodium EDTA (Versene ® CA) food grade | The Dow Chemical Co., Midland, MI |
| Calcium chloride, dihydrate (Dow Flake ®) | The Dow Chemical Co., Midland, MI |
| Erythorbic acid, FCC fine granular | Pfizer, Inc., New York, NY |
| Hydrogen peroxide, 35% | Fisher Scientific, Inc., Fair Lawn, NJ |
| Sodium bicarbonate, anhydrous, Certified ACS | Fisher Scientific, Inc., Fair Lawn, NJ |
| Sodium carbonate, anhydrous, Certified ACS | Fisher Scientific, Inc., Fair Lawn, NJ |
| Sodium erythorbate, FCC granular | Pfizer, Inc., New York, NY |
| Sodium hydroxide, Certified ACS | Fisher Scientific, Inc., Fair Lawn, NJ |
| Sodium sulfite, anhydrous, Certified ACS | Fisher Scientific, Inc., Fair Lawn, NJ |

TABLE 3

Influence of calcium chloride added to the second-stage wash solution on the color of hybrid off-white mushrooms.

| | L-value | | | |
|---|---|---|---|---|
| Treatment | Day 0 | Day 3 | Day 6 | Day 9 |
| Water Control | 92.61b | 91.68c | 86.43b | 82.83c |
| pH 11.0 no Ca | 93.95a | 94.58b | 92.57a | 89.06b |
| pH 11.0 + Ca | 94.22a | 95.09a | 92.88a | 90.69a |

Data are means of four replicates; within each day of evaluation, means followed by the same letter are not significantly different ($P < 0.05$).

TABLE 4

Influence of calcium chloride added to the second-stage wash solution on the bacterial population of fresh mushrooms.

| | CFU/ml | | | |
|---|---|---|---|---|
| Treatment | Day 0 | Day 3 | Day 6 | Day 9 |
| Water Control | $3.4 \times 10^6$a | $1.66 \times 10^8$a | $7.86 \times 10^8$a | $3.38 \times 10^8$a |
| pH 11.0 no Ca | $2.07 \times 10^6$c | $2.09 \times 10^7$b | $1.54 \times 10^8$b | $2.04 \times 10^8$b |
| pH 11.0 + Ca | $2.31 \times 10^6$b | $2.20 \times 10^7$b | $1.33 \times 10^8$b | $1.45 \times 10^8$c |

Within each day of evaluation, means followed by the same letter are not significantly different ($P < 0.05$).

TABLE 5

Effect of temperatures of wash solutions and holding times on water uptake of mushrooms.

| Treatment | Water-Weight Gain (%) |
|---|---|
| 1. pH 11.0, 10° C., 60 seconds/neutralization, 10° C., 120 seconds | 11.30 (A) |
| 2. pH 11.0, 35° C., 30 seconds/neutralization, 25° C., 60 seconds | 10.22 (B) |
| 3. pH 11.0, 10° C., 30 seconds/neutralization, 10° C., 60 seconds | 9.96 (B) |
| 4. R.O. Water, 10° C., 180 seconds | 9.50 (BC) |
| 5. pH 11.0, 35° C., 30 seconds/neutralization, 10° C., 60 seconds | 8.75 (C) |
| 6. R.O. Water, 10° C., 90 seconds | 8.25 (CD) |
| 7. pH 11.0, 25° C., 30 seconds/neutralization, 10° C., 60 seconds | 7.65 (D) |

TABLE 6

Influence of Wash Treatment Upon the Texture of Fresh Mushrooms.

| Treatment | Resistance (Kg) |
|---|---|
| 1. Unwashed Control | 0.572 (A) |
| 2. R.O. Water, 90 s | 0.570 (A) |

TABLE 6-continued

Influence of Wash Treatment Upon the Texture of Fresh Mushrooms.

| Treatment | Resistance (Kg) |
| --- | --- |
| 3. 1000 ppm Sodium Metabisulfite, 90 s | 0.567 (A) |
| 4. pH 11.0, 30 s/Neutralization*, 60 s | 0.556 (A) |
| 5. 1000 ppm Hydrogen Peroxide + 1000 ppm EDTA, 90 s | 0.546 (A) |

*Neutralization wash = 0.6% erythorbic acid + 2.4% sodium erythorbate + 1000 ppm EDTA + 1000 ppm calcium chloride.
Values are means of three replicates. Means followed by the same letter are not different at p < 0.05.

TABLE 7

Quality of Canned Mushrooms: High-pH treatment vs. Sulfite and R.O. Water Treatments.

| Treatment | Whiteness (L-value) |
| --- | --- |
| High-pH | 64.01 (A) |
| Sulfite | 61.23 (B) |
| R.O. Water | 59.13 (C) |

Values are the mean of four replications. Means followed by the same letter are not significantly different at p < 0.05.

TABLE 8

Canning Yield for Washed Mushrooms: High-pH Treatment vs. Sulfite and R.O. Water Treatments

| Treatment | Canning Yield (%)* |
| --- | --- |
| Sulfite | 65.70 (A) |
| High-pH | 65.53 (A) |
| R.O. Water | 64.85 (B) |

*Canning yield was computed on a fresh-weight basis. Values are means of four replicates. Means followed by the same letter are not significantly different at p < 0.05.

TABLE 9

Coliform Counts on Mushrooms Washed Before Freezing: High-pH Treatment vs. Sulfite and R.O. Water Treatments.

| Treatment | Coliform Count (CFU/g) | | | |
| --- | --- | --- | --- | --- |
| | 2 weeks | 4 weeks | 6 weeks | 8 weeks |
| Sulfite | 120 | 375 | 30 | 10 |
| R.O. Water | <10 | <10 | 10 | 10 |
| High pH | <10 | <10 | <10 | <10 |

Values are means of three replicate plates each of $10^{-1}$, $10^{-2}$, and $10^{-3}$ dilutions.

APPENDIX TABLE 1

Effect of a Trisodium Phosphate (TSP) Wash on the Storage Quality of Fresh Mushrooms.

| | Whiteness (L-value) | | |
| --- | --- | --- | --- |
| Treatment | Day 0 | Day 3 | Day 6 |
| 1. Unwashed Control | 90.39 | 87.32 | 81.33 |
| 2. R.O. Water, 120 s | 93.36 | 91.60 | 86.61 |
| 3. 1000 ppm Sodium Metabisulfite, 120 s | 95.10 | 92.63 | 89.53 |
| 4. 10% Trisodium Phosphate, 120 s | 60.42 | 58.84 | 58.91 |

APPENDIX TABLE 2

Influence of Reduced TSP Concentration and a Neutralization Wash on the Performance of a TSP Mushroom Preservative Treatment.

| | Whiteness (L-value) | | |
| --- | --- | --- | --- |
| Treatment | Day 0 | Day 3 | Day 6 |
| 1. R.O. Water, 120 s | 87.89 | 85.89 | 78.92 |
| 2. 1000 ppm Sodium Metabisulfite, 120 s | 93.16 | 90.75 | 82.75 |
| 3. 10% Trisodium Phosphate (TSP), 120 s | 72.45 | 70.50 | 67.51 |
| 4. 10% TSP, 60 s; R.O. Water, 60 s | 80.22 | 85.32 | 76.67 |
| 5. 10% TSP, 60 s; 4.50% E.A., 60 s | 90.82 | 91.00 | 89.50 |
| 6. 10% TSP, 60 s; 2.25% NaE, 60 s | 89.23 | 87.67 | 84.32 |
| 7. 10% TSP, 60 s; 2.25% E.A., 60 s | 90.71 | 90.91 | 84.12 |
| 8. 5% TSP, 60 s; 2.25% E.A., 60 s | 87.92 | 86.92 | 78.60 |
| 9. 2.5% TSP, 60 s; 2.25% E.A., 60 s | 89.59 | 87.38 | 77.90 |
| 10. 2.5% TSP, 60 s; 1.00% E.A., 60 s | 88.35 | 85.06 | 76.47 |

E.A. = erythorbic acid
NaE = sodium erythorbate

APPENDIX TABLE 3

Evaluation of TSP-vs. Sodium Bicarbonate-Based High-pH Preservative Treatments.

| | Whiteness (L-value) | | |
| --- | --- | --- | --- |
| Treatment | Day 0 | Day 3 | Day 6 |
| 1. R.O. Water, 120 s | 86.63 | 82.28 | 78.08 |
| 2. 1000 ppm Sodium Metabisulfite, 120 s | 94.52 | 91.23 | 83.78 |
| 3. 10% TSP, 60 s; 4.50% E.A., 60 s | 87.97 | 85.64 | 81.75 |
| 4. 10% TSP, 60 s; 2.25% B.A., 60 s | 87.45 | 83.93 | 79.36 |
| 5. 5% NaHCO$_3$, 60 s; 2.25% B.A., 60 s | 88.62 | 85.87 | 83.05 |
| 6. 0.05M NaHCO$_3$, 60 s; 0.2% E.A., 60 s | 92.66 | 92.90 | 89.10 |

We claim:

1. A method for preserving fresh and processed mushrooms, comprising the steps of:

contacting the mushrooms with an antimicrobial buffer solution having a pH of from about 9.5 to about 11.0; and rinsing the mushrooms one or more times immediately after said contacting step with pH-neutralizing buffer solutions of erythorbic acid and sodium erythorbate, in ratios of about 1:4, having a sufficient pH to return the mushrooms to the mushroom physiological pH of about 6.5.

2. The method of claim 1 wherein said antimicrobial solution is 0.05–0.5M sodium bicarbonate buffer solution, and the pH-neutralizing buffer solutions are about 0.04–0.6% erythorbic acid and about 1.6–2.4% sodium erythorbate.

3. The method of claim 2 wherein said contacting step is carried out for about 30–60 seconds at about 10–35° C., and said rinsing step is carried out for about 60–120 seconds at about 10–25° C.

4. The method of claim 3 wherein said pH-neutralizing buffer solutions further include 1000 ppm calcium-disodium EDTA.

5. The method of claim 3 wherein said pH-neutralizing buffer solutions further include 1000 ppm calcium chloride.

6. The method of claim 3 wherein said pH-neutralizing buffer solutions further include 1000 ppm calcium-disodium EDTA and 1000 ppm calcium chloride.

7. The method of claims 2–6 wherein said antimicrobial solution is a 0.05M sodium bicarbonate buffer solution having a pH of about 10.5–11.0, and the pH-neutralizing buffer solutions include about 0.6% erythorbic acid and about 2.4% sodium erythorbate, and said contacting step is carried out for about 30 seconds at about 25° C., and said rinsing step is carried out for about 60 seconds at about 10° C.

8. The method of claim 1 wherein said antimicrobial solution is a 5–10% tribasic sodium phosphate solution.

* * * * *